US011711379B2

(12) United States Patent
Diehl et al.

(10) Patent No.: US 11,711,379 B2
(45) Date of Patent: Jul. 25, 2023

(54) DISTRIBUTED DIGITAL SECURITY SYSTEM

(71) Applicant: CrowdStrike, Inc., Irvine, CA (US)

(72) Inventors: David F. Diehl, Minneapolis, MN (US); Thomas Johann Essebier, Brisbane (AU)

(73) Assignee: CrowdStrike, Inc., Irvine, CA (US)

(*) Notice: Subject to any disclaimer, the term of this patent is extended or adjusted under 35 U.S.C. 154(b) by 22 days.

(21) Appl. No.: 16/849,496

(22) Filed: Apr. 15, 2020

(65) Prior Publication Data
US 2021/0329014 A1 Oct. 21, 2021

(51) Int. Cl.
| | |
|---|---|
| *G06F 15/173* | (2006.01) |
| *H04L 9/40* | (2022.01) |
| *H04L 41/042* | (2022.01) |
| *H04L 41/28* | (2022.01) |
| *H04L 43/06* | (2022.01) |

(52) U.S. Cl.
CPC ........ *H04L 63/1416* (2013.01); *H04L 41/042* (2013.01); *H04L 41/28* (2013.01); *H04L 43/06* (2013.01); *H04L 63/1441* (2013.01); *H04L 63/1425* (2013.01)

(58) Field of Classification Search
CPC ............. H04L 63/1416; H04L 63/1441; H04L 63/1425; H04L 41/042; H04L 41/28; H04L 43/06
USPC .................................... 726/24; 709/223, 224
See application file for complete search history.

(56) References Cited

U.S. PATENT DOCUMENTS

| | | | |
|---|---|---|---|
| 7,840,501 B1 | 11/2010 | Sallam | |
| 8,779,921 B1 | 7/2014 | Curtiss | |
| 9,043,903 B2 * | 5/2015 | Diehl | ........................ G06F 9/46 726/22 |
| 9,069,930 B1 | 6/2015 | Hart | |
| 9,202,249 B1 | 12/2015 | Cohen et al. | |

(Continued)

FOREIGN PATENT DOCUMENTS

| | | |
|---|---|---|
| CN | 105550189 A | 5/2016 |
| EP | 3896934 | 10/2021 |

(Continued)

OTHER PUBLICATIONS

Office Action for U.S. Appl. No. 16/849,411, dated Oct. 6, 2021, Diehl, "Distributed Digital Security System", 9 Pages.

(Continued)

*Primary Examiner* — Thu Ha T Nguyen
(74) *Attorney, Agent, or Firm* — Lee & Hayes, P.C.

(57) ABSTRACT

A distributed security system can include instances of a compute engine that can execute either locally in security agents on client devices or as cloud instances in a security network. Event data can be processed by elements of the distributed security system according to centrally-defined ontological definitions and/or configurations. Bounding managers of local security agents can control how much event data is sent to the security network. A storage engine in the security network can store event data received from client devices, can route event data to other elements of the security network, including cloud instances of the compute engine. An experimentation engine of the security network can also at least temporarily adjust other elements of the distributed security system during experiments or tests.

20 Claims, 13 Drawing Sheets

(56) References Cited

U.S. PATENT DOCUMENTS

| | | | |
|---|---|---|---|
| 9,386,165 B2* | 7/2016 | Raleigh | H04L 12/1435 |
| 9,661,003 B2 | 5/2017 | Parker | |
| 10,200,262 B1 | 2/2019 | Leverich et al. | |
| 10,320,831 B2 | 6/2019 | Agarmore et al. | |
| 10,382,454 B2* | 8/2019 | Avidan | G06F 21/566 |
| 10,498,744 B2 | 12/2019 | Hunt | |
| 10,523,540 B2* | 12/2019 | Joshi | H04L 67/10 |
| 10,523,914 B1* | 12/2019 | Phillips | H04L 65/75 |
| 10,659,432 B2 | 5/2020 | Meyer et al. | |
| 10,673,880 B1 | 6/2020 | Pratt et al. | |
| 10,749,557 B1* | 8/2020 | Griffin | H04B 1/109 |
| 10,951,606 B1 | 3/2021 | Shahidzadeh et al. | |
| RE48,656 E* | 7/2021 | Goldner | H04M 15/73 |
| 11,132,461 B2 | 9/2021 | Swafford | |
| 11,277,416 B2 | 3/2022 | Ray et al. | |
| 11,303,651 B1 | 4/2022 | Mouleeswaran et al. | |
| 11,410,420 B1 | 8/2022 | Roy et al. | |
| 2002/0055820 A1* | 5/2002 | Scannell | G01M 5/0008 |
| | | | 702/3 |
| 2003/0200293 A1* | 10/2003 | Fearn | G06F 11/3495 |
| | | | 709/223 |
| 2004/0002961 A1 | 1/2004 | Dettinger et al. | |
| 2004/0205397 A1* | 10/2004 | Rajiv | H04L 41/16 |
| | | | 714/25 |
| 2004/0205398 A1* | 10/2004 | Osborn | G05B 23/0278 |
| | | | 714/25 |
| 2005/0086064 A1* | 4/2005 | Dively, II | G06Q 10/20 |
| | | | 705/305 |
| 2006/0031076 A1* | 2/2006 | Lei | G06Q 30/02 |
| | | | 719/328 |
| 2006/0064486 A1 | 3/2006 | Baron et al. | |
| 2007/0179709 A1* | 8/2007 | Doyle | G01C 21/3453 |
| | | | 701/417 |
| 2007/0192080 A1 | 8/2007 | Carpenter | |
| 2007/0226796 A1 | 9/2007 | Gilbert et al. | |
| 2008/0080384 A1* | 4/2008 | Atkins | H04L 41/0631 |
| | | | 370/252 |
| 2008/0126951 A1* | 5/2008 | Sood | G06Q 10/107 |
| | | | 715/752 |
| 2008/0162565 A1 | 7/2008 | Waguet | |
| 2009/0064189 A1 | 3/2009 | Cutlip | |
| 2010/0030896 A1 | 2/2010 | Chandramouli et al. | |
| 2010/0250111 A1* | 9/2010 | Gutierrez | G01C 21/3697 |
| | | | 701/532 |
| 2011/0022444 A1 | 1/2011 | Fridman et al. | |
| 2011/0099632 A1 | 4/2011 | Beck et al. | |
| 2011/0181443 A1* | 7/2011 | Gutierrez | G01C 21/3691 |
| | | | 340/990 |
| 2011/0299597 A1 | 12/2011 | Freiburg et al. | |
| 2012/0137367 A1 | 5/2012 | Dupont et al. | |
| 2012/0166688 A1 | 6/2012 | Schoning et al. | |
| 2013/0021933 A1* | 1/2013 | Kovvali | H04W 88/18 |
| | | | 370/252 |
| 2013/0290110 A1* | 10/2013 | LuVogt | G06Q 30/02 |
| | | | 705/14.66 |
| 2013/0290339 A1* | 10/2013 | LuVogt | G06F 16/9535 |
| | | | 707/E17.089 |
| 2013/0290905 A1* | 10/2013 | LuVogt | G06N 3/006 |
| | | | 715/835 |
| 2013/0333040 A1 | 12/2013 | Diehl et al. | |
| 2014/0085107 A1* | 3/2014 | Gutierrez | G08G 1/096716 |
| | | | 340/905 |
| 2014/0201836 A1* | 7/2014 | Amsler | H04L 63/20 |
| | | | 726/23 |
| 2015/0227582 A1 | 8/2015 | Gu et al. | |
| 2015/0358790 A1 | 12/2015 | Nasserbakht | |
| 2016/0119365 A1 | 4/2016 | Barel | |
| 2016/0163186 A1* | 6/2016 | Davidson | G06Q 10/0635 |
| | | | 340/506 |
| 2016/0179618 A1* | 6/2016 | Resch | H04L 67/1097 |
| | | | 714/764 |
| 2016/0191351 A1* | 6/2016 | Smith | H04L 43/045 |
| | | | 709/219 |
| 2016/0210427 A1 | 7/2016 | Mynhier et al. | |
| 2016/0246929 A1* | 8/2016 | Zenati | G10L 15/22 |
| 2016/0321574 A1* | 11/2016 | Peterson | G06Q 10/063 |
| 2016/0373588 A1* | 12/2016 | Raleigh | H04L 12/1407 |
| 2017/0012854 A1* | 1/2017 | Balasubramanian | H04L 43/14 |
| 2017/0078316 A1* | 3/2017 | Liang | H04L 63/1425 |
| 2017/0109530 A1 | 4/2017 | Diehl et al. | |
| 2017/0214701 A1 | 7/2017 | Hasan | |
| 2017/0235848 A1* | 8/2017 | Van Dusen | G06N 5/02 |
| | | | 705/12 |
| 2017/0264589 A1 | 9/2017 | Hunt et al. | |
| 2018/0004943 A1 | 1/2018 | Lukacs | |
| 2018/0013768 A1 | 1/2018 | Hunt et al. | |
| 2018/0024901 A1 | 1/2018 | Tankersley et al. | |
| 2018/0060926 A1* | 3/2018 | Guadagno | H04M 15/735 |
| 2018/0069875 A1 | 3/2018 | Ben Ezra et al. | |
| 2018/0091559 A1 | 3/2018 | Luger | |
| 2018/0173580 A1 | 6/2018 | Pavlas et al. | |
| 2018/0234434 A1 | 8/2018 | Viljoen | |
| 2018/0260251 A1 | 9/2018 | Beveridge et al. | |
| 2018/0278647 A1 | 9/2018 | Gabaev et al. | |
| 2018/0285873 A1* | 10/2018 | Espinoza | G06Q 30/0215 |
| 2018/0308112 A1* | 10/2018 | Prentice | G06Q 10/0637 |
| 2018/0329958 A1 | 11/2018 | Choudhury et al. | |
| 2018/0367549 A1 | 12/2018 | Jang et al. | |
| 2019/0014141 A1 | 1/2019 | Segal et al. | |
| 2019/0081983 A1 | 3/2019 | Teal | |
| 2019/0108470 A1* | 4/2019 | Jain | G06Q 10/063118 |
| 2019/0110241 A1* | 4/2019 | Jain | H04W 4/70 |
| 2019/0121979 A1 | 4/2019 | Chari et al. | |
| 2019/0130512 A1* | 5/2019 | Kuhn | H04L 67/00 |
| 2019/0164168 A1* | 5/2019 | Sundaramoorthy | H04L 67/306 |
| 2019/0166152 A1 | 5/2019 | Steele et al. | |
| 2019/0182269 A1 | 6/2019 | Lee et al. | |
| 2019/0190945 A1 | 6/2019 | Jang et al. | |
| 2019/0190952 A1 | 6/2019 | Cherry | |
| 2019/0222594 A1 | 7/2019 | Davis, III et al. | |
| 2019/0229915 A1 | 7/2019 | Digiambattista et al. | |
| 2019/0253451 A1 | 8/2019 | Atanda | |
| 2019/0260879 A1* | 8/2019 | Raleigh | H04M 15/83 |
| 2019/0287004 A1 | 9/2019 | Bhoj et al. | |
| 2019/0340912 A1* | 11/2019 | Sellathamby | G08B 27/005 |
| 2019/0349204 A1 | 11/2019 | Enke et al. | |
| 2019/0370146 A1* | 12/2019 | Babu | G06F 11/3089 |
| 2020/0012239 A1* | 1/2020 | Yamamoto | G06F 11/28 |
| 2020/0036603 A1* | 1/2020 | Nieves | H04L 43/065 |
| 2020/0057953 A1 | 2/2020 | Livny et al. | |
| 2020/0135311 A1* | 4/2020 | Mairs | G16H 15/00 |
| 2020/0145449 A1* | 5/2020 | Segal | H04L 63/20 |
| 2020/0193018 A1* | 6/2020 | Van Dyke | G06F 21/552 |
| 2020/0220754 A1* | 7/2020 | Hunter | H04W 74/0816 |
| 2020/0244680 A1 | 7/2020 | Brandel et al. | |
| 2020/0259852 A1 | 8/2020 | Wolff et al. | |
| 2020/0274894 A1 | 8/2020 | Argoeti et al. | |
| 2020/0285737 A1 | 9/2020 | Kraus et al. | |
| 2020/0296124 A1 | 9/2020 | Pratt et al. | |
| 2020/0321122 A1* | 10/2020 | Neumann | G16B 40/20 |
| 2020/0321512 A1 | 11/2020 | Srinivasamurthy et al. | |
| 2021/0042408 A1* | 2/2021 | Van Dyke | G06F 21/552 |
| 2021/0042854 A1 | 2/2021 | Hazy et al. | |
| 2021/0055927 A1 | 2/2021 | Sarukkai et al. | |
| 2021/0075686 A1 | 3/2021 | Smith et al. | |
| 2021/0081539 A1 | 3/2021 | Karin et al. | |
| 2021/0083891 A1* | 3/2021 | Anchondo | H04L 67/53 |
| 2021/0117251 A1 | 4/2021 | Cristofi et al. | |
| 2021/0182387 A1 | 6/2021 | Zhu et al. | |
| 2021/0211438 A1 | 7/2021 | Trim et al. | |
| 2021/0248443 A1 | 8/2021 | Shu et al. | |
| 2021/0266333 A1 | 8/2021 | Wright et al. | |
| 2021/0288981 A1 | 9/2021 | Numainville et al. | |
| 2021/0326452 A1* | 10/2021 | Diehl | H04L 63/0245 |
| 2021/0326453 A1* | 10/2021 | Diehl | G06F 21/60 |
| 2021/0329012 A1* | 10/2021 | Diehl | H04L 41/042 |
| 2021/0329013 A1* | 10/2021 | Diehl | G06F 16/24568 |
| 2021/0329014 A1* | 10/2021 | Diehl | H04L 41/042 |
| 2021/0334369 A1* | 10/2021 | Keiter | G06Q 30/0207 |
| 2021/0352099 A1 | 11/2021 | Rogers | |
| 2021/0406041 A1* | 12/2021 | Saraiya | G06F 3/04847 |
| 2022/0012148 A1* | 1/2022 | Plum | G06F 11/3075 |

(56) References Cited

U.S. PATENT DOCUMENTS

| | | |
|---|---|---|
| 2022/0067957 A1* | 3/2022 | Majumder ............ G06T 7/0002 |
| 2022/0136857 A1* | 5/2022 | Pompili ................. G16H 40/67 |
| | | 701/409 |
| 2022/0222686 A1* | 7/2022 | Mihara ................. G06Q 30/02 |
| 2022/0374434 A1 | 11/2022 | Nash |
| 2023/0046839 A1* | 2/2023 | Raleigh ................... H04L 12/14 |

FOREIGN PATENT DOCUMENTS

| | | |
|---|---|---|
| WO | WO2013184281 A1 | 12/2013 |
| WO | WO2016049319 A1 | 3/2016 |

OTHER PUBLICATIONS

Coppolino, et al, "A framework for mastering heterogeneity in multi-layer security information and event correlation", Journal of Systems Architecture, vol. 62, Dec. 2, 2015, pp. 78-88.

The Extended European Search Report dated Aug. 19, 20201 for European Patent Application No. 21164747.4, 9 pages.
The Extended European Search Report dated Aug. 24, 2021 for European Patent Application No. 21164749.0, 9 pages.
The Extended European Search Report dated Aug. 27, 2021 for European Patent Application No. 21164750.8, 8 pages.
The Extended European Search Report dated Aug. 31, 2021 for European Patent Application No. 21164751.6, 8 pages.
Extended European Search Report dated Sep. 6, 2021 for European Patent Application No. 21164753.2, 8 pages.
Office Action for U.S. Appl. No. 16/849,579, dated Apr. 26, 2022, Diehl, "Distributed Digital Security System", 20 pages.
Office Action for U.S. Appl. No. 16/849,543, dated Feb. 16, 2022, Diehl, "Distributed Digital Security System", 29 Pages.
Office Action for U.S. Appl. No. 17/325,097, dated Jun. 7, 2022, Nash, "Real-Time Streaming Graph Queries", 20 pages.
Office Action for U.S. Appl. No. 16/849,543, dated Aug. 26, 2022, Diehl, "Distributed Digital Security System", 32 Pages.
Office Action for U.S. Appl. No. 16/849,579, dated Nov. 14, 2022, Diehl, "Distributed Digital Security System", 23 pages.

* cited by examiner

DISTRIBUTED DIGITAL SECURITY SYSTEM

BACKGROUND

Digital security exploits that steal or destroy resources, data, and private information on computing devices are an increasing problem. Governments and businesses devote significant resources to preventing intrusions and thefts related to such digital security exploits. Some of the threats posed by security exploits are of such significance that they are described as cyber terrorism or industrial espionage.

Security threats come in many forms, including computer viruses, worms, trojan horses, spyware, keystroke loggers, adware, and rootkits. Such security threats may be delivered in or through a variety of mechanisms, such as spearfish clickable links, documents, executables, or archives. Other types of security threats may be posed by malicious users who gain access to a computer system and attempt to access, modify, or delete information without authorization.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Introduction

Figure 1:
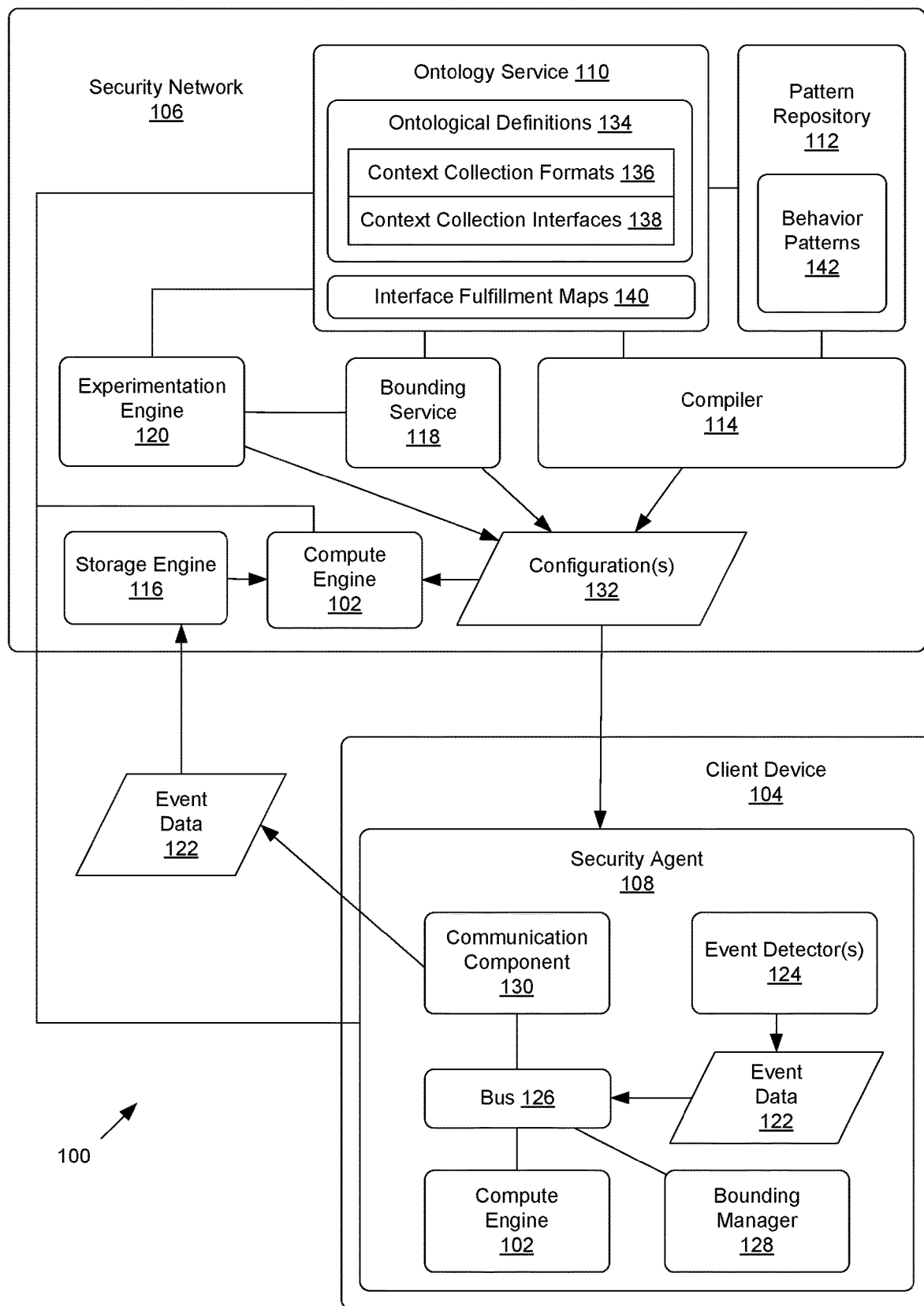
FIG. 1 depicts an example of a distributed security system.

Events can occur on computer systems that may be indicative of security threats to those systems. While in some cases a single event may be enough to trigger detection of a security threat, in other cases individual events may be innocuous on their own but be indicative of a security threat when considered in combination. For instance, the acts of opening a file, copying file contents, and opening a network connection to an Internet Protocol (IP) address may each be normal and/or routine events on a computing device when each act is considered alone, but the combination of the acts may indicate that a process is attempting to steal information from a file and send it to a server.

Digital security systems have accordingly been developed that can observe events that occur on computing devices, and that can use event data about one or more event occurrences to detect and/or analyze security threats. However, many such digital security systems are limited in some ways.

For example, some digital security systems only execute locally on individual computing devices. While this can be useful in some cases, local-only digital security systems may miss broader patterns of events associated with security threats that occur across a larger set of computing devices. For instance, an attacker may hijack a set of computing devices and cause each one to perform events that are innocuous individually, but that cause harmful results on a network, server, or other entity when the events from multiple computing devices are combined. Local-only security systems may accordingly not be able to detect a broader pattern of events across multiple computing devices.

Some digital security systems do cause event data to be reported to servers or other network elements, such that network and/or cloud processing can be used to analyze event data from one or more computing devices. However, many such cloud-based systems can become overloaded with event data reported by individual computing devices, much of which may be noise and thus be irrelevant to security threat detection. For example, many systems do not have ways of limiting the event data that is initially reported to the cloud. Many systems also do not provide indications to the cloud about reasons why specific event data has been sent to the cloud.

Additionally, many systems only hold reported event data for a certain period of time before it is deleted for storage space and/or other reasons. However, that period of time may be too long or too short depending on how relevant the data is to detection of security threats. As an example, a web server may have a temporary parent process that spawns one or more child processes that then run for months or years. Many existing digital security systems may delete event data about that parent process after a threshold period of time, even though event data about the parent process may continue to be relevant to understanding how a child process was spawned on the web server months or years later. As another example, many existing systems would store event data that is likely to be noise for the same amount of time as other event data that may be much more likely to be relevant to security threat detection.

It can also be difficult to keep local components and network components of a digital security system synchronized such that they use the same data types, and/or are looking for the same types of events or patterns of events. For example, in many systems a locally-executing security application is coded entirely separately from a cloud processing application. In some cases, the two may use different data types to express event data, such that a digital security system may need to devote time and computing resources to conversion operations that allow a cloud processing application to operate on event data reported by a local application. Additionally, because locally-executing applications are often coded separately from cloud processing applications, it can take significant time and/or resources to separately recode and update each type of component to look for new types of security threats. Further, if local applications report event data to cloud elements of a network in a first format but are later updated to report similar event data in a second format, the cloud elements may need to be specially coded to maintain compatibility with both the first format and the second format to be able to evaluate old and new event data.

Additionally, many digital security systems are focused on event detection and analysis, but do not allow specialized configurations to be sent to components that change how the components operate for testing and/or experimentation purposes. For example, in many systems there may be no mechanism for instructing local components on a set of computing devices to at least temporarily report additional event data to the cloud about a certain type of event that an analyst suspects may be part of a security threat.

Described herein are systems and methods for a distributed digital security system that can address these and other deficiencies of digital security systems.

Distributed Security System

FIG. 1 depicts an example of a distributed security system 100. The distributed security system 100 can include distributed instances of a compute engine 102 that can run locally on one or more client devices 104 and/or in a security network 106. As an example, some instances of the compute engine 102 can run locally on client devices 104 as part of security agents 108 executing on those client devices 104. As another example, other instances of the compute engine 102 can run remotely in a security network 106, for instance within a cloud computing environment associated with the distributed security system 100. The compute engine 102 can execute according to portable code that can run locally as part of a security agent 108, in a security network 106, and/or in other local or network systems that can also process event data as described herein.

A client device 104 can be, or include, one or more computing devices. In various examples, a client device 104 can be a work station, a personal computer (PC), a laptop computer, a tablet computer, a personal digital assistant (PDA), a cellular phone, a media center, an Internet of Things (IoT) device, a server or server farm, multiple distributed server farms, a mainframe, or any other sort of computing device or computing devices. In some examples, a client device 104 can be a computing device, component, or system that is embedded or otherwise incorporated into another device or system. In some examples, the client device 104 can also be a standalone or embedded component that processes or monitors incoming and/or outgoing data communications. For example, the client device 104 can be a network firewall, network router, network monitoring component, a supervisory control and data acquisition (SCADA) component, or any other component. An example system architecture for a client device 104 is illustrated in greater detail in FIG. 15, and is described in detail below with reference to that figure.

The security network 106 can include one or more servers, server farms, hardware computing elements, virtualized computing elements, and/or other network computing elements that are remote from the client devices 104. In some examples, the security network 106 can be considered to be a cloud or a cloud computing environment. Client devices 104, and/or security agents 108 executing on such client devices 104, can communicate with elements of the security network 106 through the Internet or other types of network and/or data connections. In some examples, computing elements of the security network 106 can be operated by, or be associated with, an operator of a security service, while the client devices 104 can be associated with customers, subscribers, and/or other users of the security service. An example system architecture for one or more cloud computing elements that can be part of the security network 106 is illustrated in greater detail in FIG. 16, and is described in detail below with reference to that figure.

As shown in FIG. 1, instances of the compute engine 102 can execute locally on client devices 104 as part of security agents 108 deployed as runtime executable applications that run locally on the client devices 104. Local instances of the compute engine 102 may execute in security agents 108 on a homogeneous or heterogeneous set of client devices 104.

One or more cloud instances of the compute engine 102 can also execute on one or more computing elements of the security network 106, remote from client devices 104. The distributed security system 100 can also include a set of other cloud elements that execute on, and/or are stored in, one or more computing elements of the security network 106. The cloud elements of the security network 106 can include an ontology service 110, a pattern repository 112, a compiler 114, a storage engine 116, a bounding service 118, and/or an experimentation engine 120.

As described further below, local and/or cloud instances of the compute engine 102, and/or other elements of the distributed security system 100, can process event data 122 about single events and/or patterns of events that occur on one or more client devices 104. Events can include any observable and/or detectable type of computing operation, behavior, or other action that may occur on one or more client devices 104. Events can include events and behaviors associated with Internet Protocol (IP) connections, other network connections, Domain Name System (DNS) requests, operating system functions, file operations, registry changes, process executions, hardware operations, such as virtual or physical hardware configuration changes, and/or any other type of event. By way of non-limiting examples, an event may be that a process opened a file, that a process initiated a DNS request, that a process opened an outbound connection to a certain IP address, that there was an inbound IP connection, that values in an operating system registry were changed, or be any other observable or detectable occurrence on a client device 104. In some examples, events based on other such observable or detectable occurrences can be physical and/or hardware events, for instance that a Universal Serial Bus (USB) memory stick or other USB device was inserted or removed, that a network cable was plugged in or unplugged, that a cabinet door or other component of a client device 104 was opened or closed, or any other physical or hardware-related event.

Events that occur on client devices 104 can be detected or observed by event detectors 124 of security agents 108 on those client devices 104. For example, a security agent 108 may execute at a kernel-level and/or as a driver such that the security agent 108 has visibility into operating system activities from which one or more event detectors 124 of the security agent 108 can observe event occurrences or derive or interpret the occurrences of events. In some examples, the security agent 108 may load at the kernel-level at boot time of the client device 104, before or during loading of an operating system, such that the security agent 108 includes kernel-mode components such as a kernel-mode event detector 124. In some examples, a security agent 108 can also, or alternately, have components that operate on a computing device in a user-mode, such as user-mode event detectors 124 that can detect or observe user actions and/or user-mode events. Examples of kernel-mode and user-mode components of a security agent 108 are described in greater detail in U.S. patent application Ser. No. 13/492,672, entitled "Kernel-Level Security Agent" and filed on Jun. 8, 2012, which issued as U.S. Pat. No. 9,043,903 on May 26, 2015, and which is hereby incorporated by reference.

When an event detector 124 of a security agent 108 detects or observes a behavior or other event that occurs on a client device 104, the security agent 108 can place corresponding event data 122 about the event occurrence on a bus 126 or other memory location. For instance, in some examples the security agent 108 may have a local version of the storage engine 116 described herein, or have access to other local memory on the client device 104, where the security agent 108 can at least temporarily store event data 122. The event data 122 on the bus 126, or stored at another memory location, can be accessed by other elements of the security agent 108, including a bounding manager 128, an instance of the compute engine 102, and/or a communication component 130 that can send the event data 122 to the security network 106. The event data 122 can be formatted and/or processed according to information stored at, and/or provided by, the ontology service 110, as will be described further below. The event data 122 may also be referred to as a "context collection" of one or more data elements.

Each security agent 108 can have a unique identifier, such as an agent identifier (AID). Accordingly, distinct security agents 108 on different client devices 104 can be uniquely identified by other elements of the distributed security system 100 using an AID or other unique identifier. In some examples, a security agent 108 on a client device 104 can also be referred to as a sensor.

In some examples, event data 122 about events detected or observed locally on a client device 104 can be processed locally by a compute engine 102 and/or other elements of a local security agent 108 executing on that client device 104. However, in some examples, event data 122 about locally-occurring events can also, or alternately, be sent by a security agent 108 on a client device 104 to the security network 106, such that the event data 122 can be processed by a cloud instance of the compute engine 102 and/or other cloud elements of the distributed security system 100. Accordingly, event data 122 about events that occur locally on client devices 104 can be processed locally by security agents 108, be processed remotely via cloud elements of the distributed security system 100, or be processed by both local security agents 108 and cloud elements of the distributed security system 100.

In some examples, security agents 108 on client devices 104 can include a bounding manager 128 that can control how much event data 122, and/or what types of event data 122, the security agents 108 ultimately send to the security network 106. The bounding manager 128 can accordingly prevent the security network 106 from being overloaded with event data 122 about every locally-occurring event from every client device 104, and/or can limit the types of event data 122 that are reported to the security network 106 to data that may be more likely to be relevant to cloud processing, as will be described further below. In some examples, a bounding manager 128 can also mark-up event data 122 to indicate one or more reasons why the event data 122 is being sent to the security network 106, and/or provide statistical information to the security network 106. The bounding manager 128, and operations of the bounding manager 128, are discussed further below with respect to FIGS. 6 and 7.

Cloud elements such as the compiler 114, the bounding service 118, and/or the experimentation engine 120 can generate configurations 132 for other elements of the distributed security system 100. Such configurations 132 can include configurations 132 for local and/or cloud instances of the compute engine 102, configurations 132 for local bounding managers 128, and/or configurations 132 for other elements. Configurations 132 can be channel files, executable instructions, and/or other types of configuration data.

The ontology service 110 can store ontological definitions 134 that can be used by elements of the distributed security system 100. For example, rules and other data included in configurations 132 for the compute engine 102, bounding manager 128, and/or other elements can be based on ontological definitions 134 maintained at the ontology service 110. As discussed above, a piece of event data 122 that is generated by and/or processed by one or more components of the distributed security system 100 can be a "context collection" of data elements that is formatted and/or processed according to information stored at, and/or provided by, the ontology service 110. The ontological definitions 134 maintained at the ontology service can, for example, include definitions of context collection formats 136 and context collection interfaces 138. The ontology service 110 can also store interface fulfillment maps 140. Each interface fulfillment map 140 can be associated with a specific pairing of a context collection format 136 and a context collection interface 138.

An ontological definition 134 of a context collection format 136 can define data elements and/or a layout for corresponding event data 122. For example, an ontological definition 134 of a context collection format 136 can identify specific types of information, fields, or data elements that should be captured in event data 122 about a type of event that occurs on a client device 104. For example, although any number of attributes about an event that occurs on a client device 104 could be captured and stored in event data 122, an ontological definition 134 of a context collection format 136 can define which specific attributes about that event are to be recorded into event data 122 for further review and processing. Accordingly, event data 122 can be considered to be a context collection associated with a particular context collection format 136 when the event data 122 includes data elements as defined in an ontological definition 134 of that particular context collection format 136.

As an example, if a buffer on a client device 104 includes information about four different processes associated with an event, and the four processes were spawned by a common parent process, an ontological definition 134 of a context collection format 136 associated with that event may indicate that only a process II) of the common parent process should be stored in event data 122 for that event, without storing process IDs of the four child processes in the event data 122. However, as another example, an ontological definition 134 of a different context collection format 136 may indicate that a set of process IDs, including a parent process ID and also a set of child process IDs, should be stored in event data 122 to indicate a more complex structure of parent-child process relationships associated with an event. A context collection format 136 may also, or alternately, indicate other types of data elements or fields of information that should be captured about an event, such as a time, event type, network address of other network-related information, client device 104 information, and/or any other type of attribute or information.

Various client devices 104 and/or other elements of the distributed security system 100 may capture or process event data 122 based on the same or different context collection formats 136. For example, a first security agent 108 on a first client device 104 that detects a network event may capture event data 122 about the network event including an associated process ID according to a first context collection format 136 for network events. However, a second security agent 108 on a second client device 104 may detect the same type of network event, but may capture event data 122 about the network event including an associated process ID as well as additional attributes such as an associated time or network address according to a second context collection format 136 for network events. In this example, the first security agent 108 and the second security agent 108 may transmit event data 122 for the same type of network event to the security network 106 based on different context collection formats 136. However, a cloud instance of the compute engine 102, or other elements of the distributed security system 100, may nevertheless be configured to process event data 122 based on different context collection formats 136 when the event data 122 satisfies the same context collection interface 138.

An ontological definition 134 of a context collection interface 138 can indicate a set of one or more data elements that a component of the distributed security system 100 expects to be present within event data 122 in order for the component to consume and/or process the event data 122. In particular, an ontological definition 134 of a context collection interface 138 can define a minimum set of data elements, such that event data 122 that includes that minimum set of data elements may satisfy the context collection interface 138, although additional data elements beyond the minimum set may or may not also be present in that event data 122. As an example, if an ontological definition 134 of a context collection interface 138 specifies that data elements A and B are to be present in event data 122, a first piece of event data 122 that includes data elements A and B may satisfy the context collection interface 138, and a second piece of event data 122 that includes data elements A, B, and C may also satisfy the context collection interface 138. However, in this example, a third piece of event data 122 that includes data elements A and C would not satisfy the context collection interface 138, because the third piece of event data 122 does not include data element 13 specified by the ontological definition 134 of the context collection interface 138.

The ontology service 110 can also generate and/or maintain interface fulfillment maps 140. In some examples, an interface fulfillment nap 140 may also be referred to as a context collection implementation. An interface fulfillment map 140 can be provided in the ontology service 110 for individual pairs of context collection formats 136 and context collection interfaces 138. An interface fulfillment map 140 associated with a particular context collection format 136 and a particular context collection interface 138 can indicate how event data 122, formatted according to the particular context collection format 136, satisfies the particular context collection interface 138. Accordingly, event data 122 formatted according to a particular context collection format 136 may satisfy a particular context collection interface 138 if the event data 122 includes the data elements specified by the ontological definition 134 of the particular context collection interface 138, and if an interface fulfillment map 140 exists at the ontology service 110 that is associated with both the particular context collection format 136 and the particular context collection interface 138.

For example, when an ontological definition 134 of a particular context collection interface 138 specifies that data elements A and B are to be present for event data 122 to match the particular context collection interface 138, the ontology service 110 can have a first interface fulfillment map 140 associated with the particular context collection interface 138 and a first context collection format 136, and a second interface fulfillment map 140 associated with the particular context collection interface 138 and a second context collection format 136. The first interface fulfillment map 140 can indicates that a specific first portion, such as one or more specific bits, of event data 122 formatted according to the first context collection format 136 maps to data element A of the context collection interface 138, and that a specific second portion of that event data 122 maps to data element B of the context collection interface 138. The second interface fulfillment map 140 may indicate that a different portion of event data 122 formatted according to the second context collection format 136 maps to data element A of the context collection interface 138, and that a different second portion of that event data 122 maps to data element B of the context collection interface 138.

The ontology service 110 can provide interface fulfillment maps 140 to compute engines 102, bounding managers 128, and/or other elements of the distributed security system 100. As discussed above, an element of the distributed security system 100 may consume or process event data 122 according to a context collection interface 138. For example, elements of the distributed security system 100 can be configured, for instance via configurations 132, to process event data 122 based in part on whether event data 122 satisfies particular context collection interfaces 138. Accordingly, when an element, such as a compute engine 102 or a bounding manager 128, receives event data 122 formatted according to a particular context collection format 136, the element can use an interface fulfillment map 140 that corresponds to that particular context collection format 136 and the context collection interface 138 to determine whether the received event data 122 satisfies the context collection interface 138, and/or to locate and identify specific portions of the event data 122 that match the data elements specified by the ontological definition 134 of the context collection interface 138.

For example, a configuration 132 for a compute engine 102 can be based on a context collection interface 138 that specifies that a process ID for a network event should be included in event data 122. The compute engine 102 can accordingly use that configuration 132 and corresponding interface fulfillment maps 140 to process event data 122 that the compute engine 102 receives for network events that is formatted according to any context collection format 136 that includes at least the process ID expected by the context collection interface 138. Accordingly, if the compute engine 102 receives first event data 122 about a first network event is formatted based on a first context collection format 136 that includes a process II), and also receives second event data 122 about a second network event is formatted based on a second context collection format 136 that includes a process ID as well as execution time data, the compute engine 102 can nevertheless process both the first event data 122 and the second event data 122 because both include at least the process ID specified by the context collection interface 138. As such, the compute engine 102 can use the same configuration 132 to process event data 122 in varying forms that include at least common information expected by a context configuration interface 138, without needing new or updated configurations 132 for every possible data type or format for event data 122.

In some examples, an ontological definition 134 can define authorization levels for individual fields or other data elements within event data 122. For example, an ontological definition 134 of a context collection format 136 can define authorization levels on a field-by-field or element-by-element basis. As will be described further below, in some examples different users or elements of the distributed security system 100 may be able to access or retrieve information from different sets of fields within the same event data 122, for example as partial event data 122, based on whether the user or element has an authorization level corresponding to the authorization levels of individual fields of the event data 122.

The ontological definitions 134 can be used, either directly or indirectly, consistently by multiple elements throughout the distributed security system 100. For example, an ontological definition 134 can be used by any runtime element of the distributed security system 100, and the ontological definition 134 may be agnostic as to whether any particular runtime element of the distributed security system 100 is running according to a C++ runtime, a Java runtime, or any other runtime. In some examples, new and/or edited data types defined by ontological definitions 134 at the ontological service 110 can be used by multiple elements of the distributed security system 100 without manually recoding those elements individually to use the new and/or edited data types or adjusting the ontological definitions 134 to work with different types of runtimes.

As an example, when a new ontological definition 134 for a new context collection format 136 is defined at the ontology service 110, a compiler 114 or other element can automatically generate new configurations 132 for compute engines 102, event detectors 124, or other elements that can generate new or refined event data 122, such that the new or refined event data 122 is formatted to include data elements based on the new context collection format 136. For instance, as will be discussed below, a compute engine 102 and/or other elements of the distributed security system 100 can process incoming event data 122 to generate new event data 122, for example by refining and/or combining received event data 122 using refinement operations and/or composition operations. Accordingly, an ontological definition 134 can define a context collection format 136 indicating which types of data elements should be copied from received event data 122 and be included in new refined event data 122 according to a refinement operation, or be taken from multiple pieces of received event data 122 and used to generate new combined event data 122 according to a composition operation. In other examples, when a new ontological definition 134 for a new context collection format 136 is defined at the ontology service 110, new interface fulfillment maps 140 that correspond to the new context collection format 136 and one or more context collection interfaces 138 can be generated and provided to elements of the distributed security system 100.

As another example, when a new ontological definition 134 for a new context collection interface 138 is defined at the ontology service 110, the compiler 114 can automatically generate configurations 132 for local and cloud instances of the compute engine 102. The configurations 132 can indicate expected data elements according to the new context collection interface 138, such that the compute engine 102 can process any type of event data 122 that is based on any context collection format 136 that includes at least those expected data elements when a corresponding interface fulfillment map 140 exists, even though no new source code has been written for the compute engine 102 that directly indicates how to process each possible type or format of event data 122 that may include those expected data types. Similarly, the bounding service 118 can generate configurations 132 for bounding managers 128 based at least in part on the ontological definition 134 of a new context collection interface 138, such that the bounding manager 128 can also process event data 122 that matches the new context collection interface 138 when a corresponding interface fulfillment map 140 exists. In other examples, when a new ontological definition 134 for a new context collection format 136 is defined at the ontology service 110, new interface fulfillment maps 140 that correspond to the new context collection format 136 and one or more context collection interfaces 138 can be generated and provided to elements of the distributed security system 100. Accordingly, a new context collection interface 138 can be used by both the compute engine 102 and the bounding manager 128 based on a corresponding interface fulfillment map 140, without directly recoding either of the compute engine 102 or the bounding manager 128 or regardless of whether instances of the compute engine 102 and/or the bounding manager 128 execute using different runtimes.

In some examples, a user interface associated with the ontology service 110 can allow users to add and/or modify ontological definitions 134. In some examples, elements of the distributed security system 100 may, alternately or additionally, access the ontology service 110 to add and/or modify ontological definitions 134 used by those elements, such that other elements of the distributed security system 100 can in turn be configured to operate according to the ontological definitions 134 stored at the ontology service 110.

For example, as will be described in further detail below, a compiler 114 can generate configurations 132 for instances of the compute engine 102 based on text descriptions of types of events and/or patterns of events that are to be detected and/or processed using the distributed security system 100. If the compiler 114 determines that such a configuration 132 would involve the compute engine 102 generating new types of event data 122 that may include new data elements or a different arrangement of data elements, for example using refinement operations or composition operations as discussed below with respect to FIGS. 2 and 3, the compute engine 102 can add or modify ontological definitions 134 of corresponding context collection formats 136 at the ontological service 110. Other elements of the distributed security system 100 can in turn obtain the new or modified ontological definitions 134 and/or interface fulfillment maps 140 from the ontological service 110 to understand how to interpret those new types of event data 122.

In some examples, one or more elements of the distributed security system 100 can store local copies or archives of ontological definitions 134 and/or interface fulfillment maps 140 previously received from the ontology service 110. However, if an element of the distributed security system 100 receives data in an unrecognized format, the element can obtain a corresponding ontological definition 134 or interface fulfillment map 140 from the ontology service 110 such that the element can understand and/or interpret the data. The ontology service 110 can also store archives of old ontological definitions 134 and/or interface fulfillment maps 140, such that elements of the distributed security system 100 can obtain copies of older ontological definitions 134 or interface fulfillment maps 140 if needed.

For instance, if for some reason a particular security agent 108 running on a client device 104 has not been updated in a year and is using an out-of-date configuration 132 based on old ontological definitions 134, that security agent 108 may be reporting event data 122 to the security network 106 based on an outdated context collection format 136 that more recently-updated cloud elements of the distributed security system 100 do not directly recognize. However, in this situation, cloud elements of the distributed security system 100 can retrieve old ontological definitions 134 from the ontology service 110 and thus be able to interpret event data 122 formatted according to an older context collection format 136.

The pattern repository 112 can store behavior patterns 142 that define patterns of one or more events that can be detected and/or processed using the distributed security system 100, A behavior pattern 142 can identify a type of event, and/or a series of events of one or more types, that represent a behavior of interest. For instance, a behavior pattern 142 can identify a series of events that may be associated with malicious activity on a client device 104, such as when malware is executing on the client device 104, when the client device 104 is under attack by an adversary who is attempting to access or modify data on the client device 104 without authorization, or when the client device 104 is subject to any other security threat.

In some examples, a behavior pattern 142 may identify a pattern of events that may occur on more than one client device 104. For example, a malicious actor may attempt to avoid detection during a digital security breach by causing different client devices 104 to perform different events that may each be innocuous on their own, but that can cause malicious results in combination. Accordingly, a behavior pattern 142 can represent a series of events associated with behavior of interest that may occur on more than one client device 104 during the behavior of interest. In some examples, cloud instances of the compute engine 102 may be configured to identify when event data 122 from multiple client devices 104 collectively meets a behavior pattern 142, even if events occurring locally on any of those client devices 104 individually would not meet the behavior pattern 142.

In some examples, a "rally point" or other behavior identifier may be used to link event data 122 associated with multiple events that may occur on one or more client devices 104 as part of a larger behavior pattern 142. For example, as will be described below, a compute engine 102 can create a rally point 306 when first event data 122 associated with a behavior pattern 142 is received, to be used when second event data 122 that is received at a later point in time that is also associated with the behavior pattern 142. Rally points are discussed in more detail below with respect to FIG. 3 in association with composition operations.

The compiler 114 can generate configurations 132 for cloud and/or local instances of the compute engine 102. In some examples, the compiler 114 can generate configurations 132 based at least in part on ontological definitions 134 from the ontology service 110 and/or behavior patterns 142 from the pattern repository 112. For example, a behavior pattern 142 may indicate logic for when event data 122 about a pattern of events can be created and/or processed.

In some examples, the compiler 114 can generate configurations 132 for the compute engine 102 using a fundamental model that includes refinements and/or compositions of behavioral expressions, as will be discussed further below. Although a configuration 132 for the compute engine 102 can include binary representations of instructions, those instructions can be generated by the compiler 114 such that the instructions cause the compute engine 102 to process and/or format event data 122 based on corresponding context collection formats 136 and/or context collection interfaces 138 defined by ontological definitions 134. When generating configurations 132, the compiler 114 can also perform type-checking and safety check instructions expressed in the configurations 132, such that the instructions are safe to be executed by other runtime components of the distributed security system 100 according to the configurations 132.

The storage engine 116 can process and/or manage event data 122 that is sent to the security network 106 by client devices 104. In some examples, the storage engine 116 can receive event data 122 from security agents 108 provided by an operator of a security service that also runs the security network 106. However, in other examples, the storage engine 116 can also receive and process event data 122 from any other source, including security agents 108 associated with other vendors or streams of event data 122 from other providers.

As will be explained in more detail below, the storage engine 116 can sort incoming event data 122, route event data 122 to corresponding instances of the compute engine 102, store event data 122 in short-term and/or long-term storage, output event data 122 to other elements of the distributed security system 100, and/or perform other types of storage operations. The storage engine 116, and operations of the storage engine 116, are discussed further below with respect to FIGS. 8-13.

The bounding service 118 can generate configurations 132 for bounding managers 128 of local security agents 108. For example, the bounding service 118 can generate new or modified bounding rules that can alter how much, and/or what types of, event data 122 a bounding manager 128 permits a security agent 108 to send to the security network 106. The bounding service 118 can provide the bounding rules to bounding managers 128 in channel files or other types of configurations 132. In some examples, a user interface associated with the bounding service 118 can allow users to add and/or modify bounding rules for bounding managers 128. In some examples, bounding rules can be expressed through one or more selectors 602, as discussed further below with respect to FIG. 6.

The experimentation engine 120 can create configurations 132 for elements of the distributed security system 100 that can at least temporarily change how those elements function for experimentation and/or test purposes. For example, the experimentation engine 120 can produce a configuration 132 for a bounding manager 128 that can cause the bounding manager 128 to count occurrences of a certain type of event that is expected to be relevant to an experiment, or to cause a security agent 108 to send more event data 122 about that event type to the security network 106 than it otherwise would. This can allow the security network 106 to obtain different or more relevant event data 122 from one or more client devices 104 that can be used to test hypotheses, investigate suspected security threats, test how much event data 122 would be reported if an experimental configuration 132 was applied more broadly, and/or for any other reason. The experimentation engine 120, and operations of the experimentation engine 120, are discussed further below with respect to FIG. 14.

Compute Engine

An instance of the compute engine 102, in the security network 106 or in a security agent 108, can perform comparisons, such as string match comparisons, value comparisons, hash comparisons, and/or other types of comparisons on event data 122 for one or more events, and produce new event data 122 based on results of the comparisons. For example, an instance of the compute engine 102 can process event data 122 in an event stream using refinements and/or compositions of a fundamental model according to instructions provided in a configuration 132. Refinement operations 202 and composition operations 302 that instances of the compute engine 102 can use are discussed below with respect to FIGS. 2-4.

Figure 2:
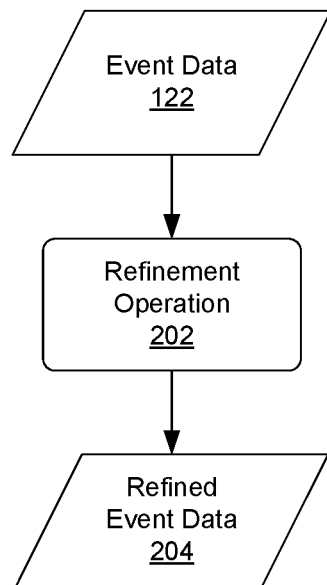
FIG. 2 depicts an example of a refinement operation that can be performed by an instance of a compute engine in a distributed security system.

FIG. 2 depicts an example of a refinement operation 202 that can be performed by an instance of the compute engine 102. A refinement operation 202 can have filter criteria that the compute engine 102 can use to identify event data 122 that the refinement operation 202 applies to. For example, the filter criteria can define target attributes, values, and/or data elements that are to be present in event data 122 for the refinement operation 202 to be applicable to that event data 122. In some examples, filter criteria for a refinement operation 202 can indicate conditions associated with one or more fields of event data 122, such as the filter criteria is satisfied if a field holds an odd numerical value, if a field holds a value in a certain range of values, or if a field holds a text string matching a certain regular expression. When the compute engine 102 performs comparisons indicating that event data 122 matches the filter criteria for a particular refinement operation 202, the refinement operation 202 can create new refined event data 204 that includes at least a subset of data elements from the original event data 122.

For example, if the compute engine 102 is processing event data 122 as shown in FIG. 2, and the event data 122 includes data elements that match criteria for a particular refinement operation 202, the refinement operation 202 can create refined event data 204 that includes a least a subset of data elements selected from event data 122. In some examples, the data elements in the refined event data 204 can be selected from the original event data 122 based on a context collection format 136. A refinement operation 202 can accordingly result in a reduction or a down-selection of event data 122 in an incoming event stream to include refined event data 204 containing a subset of data elements from the event data 122.

As a non-limiting example, event data 122 in an event stream may indicate that a process was initiated on a client device 104, A refinement operation 202 may, in this example, include filter criteria for a string comparison, hash comparison, or other type of comparison that can indicate creations of web browser processes. Accordingly, the refinement operation 202 can apply if such a comparison indicates that the created process was a web browser process. The compute engine 102 can accordingly extract data elements from the event data 122 indicating that the initiated process is a web browser, and include at least those data elements in newly generated refined event data 204.

In some examples, new refined event data 204 can be added to an event stream as event data 122, such as the same and/or a different event stream that contained the original event data 122. Accordingly, other refinement operations 202 and/or composition operations 302 can operate on the original event data 122 and/or the new refined event data 204 from the event stream.

Figure 3:
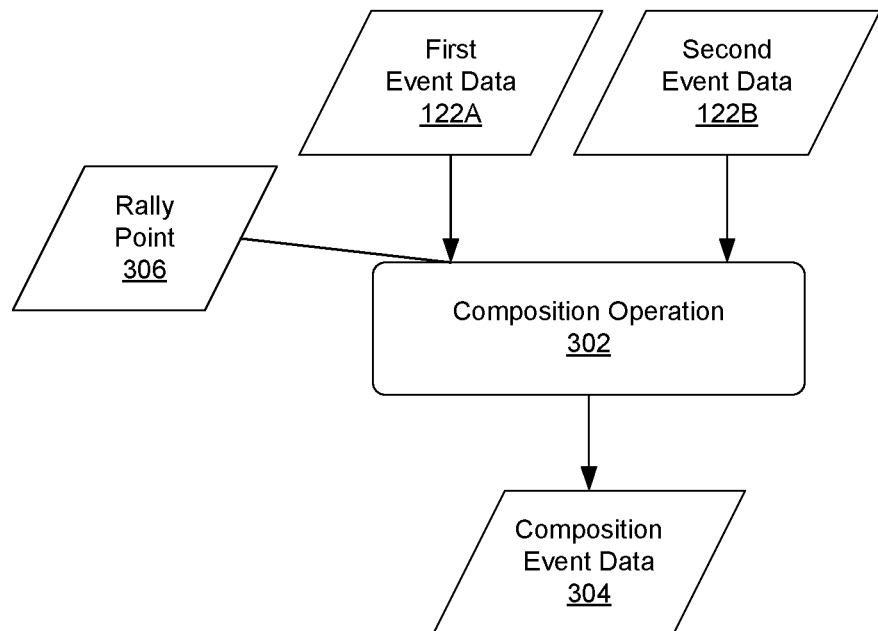
FIG. 3 depicts an example of a composition operation that can be performed by an instance of a compute engine in a distributed security system.

FIG. 3 depicts an example of a composition operation 302 that can be performed by an instance of the compute engine 102. A composition operation 302 can have criteria that the compute engine 102 can use to identify event data 122 that the composition operation 302 applies to. The criteria for a composition operation 302 can identify at least one common attribute that, if shared by two pieces of event data 122, indicates that the composition operation 302 applies to those two pieces of event data 122. For example, the criteria for a composition operation 302 can indicate that the composition operation 302 applies to two pieces of event data 122 when the two pieces of event data 122 are associated with child processes that have the same parent process.

The compute engine 102 can accordingly use comparison operations to determine when two pieces of event data 122 from one or more event streams meet criteria for a composition operation 302. When two pieces of event data 122 meet the criteria for a composition operation 302, the composition operation 302 can generate new composition event data 304 that contains data elements extracted from both pieces of event data 122. In some examples, the data elements to be extracted from two pieces of event data 122 and used to create the new composition event data 304 can be based on a context collection format 136.

As an example, when first event data 122A and second event data 122B shown in FIG. 3 meet criteria of the composition operation 302, the composition event data 304 can be generated based on a context collection format 136 to include data elements from the first event data 122A and from the second event data 122B. In some examples, the context collection format 136 for the composition event data 304 can include a first branch of data elements extracted from the first event data 122A, and include a second branch of data elements extracted from the second event data 122B. Accordingly, while the first event data 122A and the second event data 122B may be formatted according to a first context collection format 136, or according to different context collection formats 136, the composition event data 304 can be generated based on another context collection format 136 that is different from the context collection formats 136 of the first event data 122A and the second event data 122B, but identifies at least a subset of data elements from each of the first event data 122A and the second event data 122B.

In some examples, new composition event data 304 created by a composition operation 302 can be added to an event stream as event data 122, such as the same and/or a different event stream that contained original event data 122 used by the composition operation 302. Accordingly, other refinement operations 202 and/or composition operations 302 can operate on the original event data 122 and/or the new composition event data 304 from the event stream.

A composition operation 302 can be associated with an expected t po ordered arrival of two pieces of event data 122. For example, the composition operation 302 shown in FIG. 3 can apply when first event data 122A arrives at a first point in time and second event data 122B arrives at a later second point in time. Because the first event data 122A may arrive before the second event data 122B, a rally point 306 can be created and stored when the first event data 122A arrives. The rally point 306 can then be used if and when second event data 122B also associated with the rally point 306 arrives ata later point in time. For example, a composition operation 302 can be defined to create new composition event data 304 from a child process and its parent process, if the parent process executed a command line. In this example, a rally point 306 associated with a first process can be created and stored when first event data 122A indicates that the first process runs a command line. At a later point, new event data 122 may indicate that a second process, with an unrelated parent process different from the first process, is executing. In this situation, the compute engine 102 can determine that a stored rally point 306 associated with the composition does not exist for the unrelated parent process, and not generate new composition event data 304 via the composition operation 302. However, if further event data 122 indicates that a third process, a child process of the first process, has launched, the compute engine 102 would find the stored rally point 306 associated with the first process and generate the new composition event data 304 via the composition operation 302 using the rally point 306 and the new event data 122 about the third process.

In particular, a rally point 306 can store data extracted and/or derived from first event data 122. The rally point 306 may include pairs and/or tuples of information about the first event data 122 and/or associated processes. For example, when the first event data 122A is associated with a child process spawned by a parent process, the data stored in association with a rally point 306 can be based on a context collection format 136 and include data about the child process as well as data about the parent process. In some examples, the data stored in association with a rally point 306 may include at least a subset of the data from the first event data 122A.

A rally point 306 can be at least temporarily stored in memory accessible to the instance of the compute engine 102, for example in local memory on a client device 104 or in cloud storage in the security network 106. The rally point 306 can be indexed in the storage based on one or more composition operations 302 that can use the rally point 306 and/or based on identities of one or more types of composition event data 304 that can be created in part based on the rally point 306.

When second event data 122B is received that is associated with the composition operation 302 and the rally point 306, the compute engine 102 can create new composition event data 304 based on A) data from the first event data 122 that has been stored in the rally point 306 and B) data from the second event data 122B. In some examples, the rally point 306, created upon the earlier arrival of the first event data 122A, can be satisfied due to the later arrival of the second event data 122, and the compute engine 102 can delete the rally point 306 or mark the rally point 306 for later deletion to clear local or cloud storage space.

In some examples, a rally point 306 that has been created and stored based on one composition operation 302 may also be used by other composition operations 302. For example, as shown in FIG. 3, a rally point 306 may be created and stored when first event data 122A is received with respect to a first composition operation 302 that expects the first event data 122A followed by second event data 122B. However, a second composition operation 302 may expect the same first event data 122A to followed by another type of event data 122 that is different from the second event data 122B. In this situation, a rally point 306 that is created to include data about the first event data 122A, such as data about a child process associated with the first event data 122A and a parent process of that child process, can also be relevant to the second composition operation 302. Accordingly, the same data stored for a rally point 306 can be used for multiple composition operations 302, thereby increasing efficiency and reducing duplication of data stored in local or cloud storage space.

In some examples, the compute engine 102 can track reference counts of rally points 306 based on how many composition operations 302 are waiting to use those rally points 306. For instance, in the example discussed above, a rally point 306 that is generated when first event data 1122A arrives may have a reference count of two when the first composition operation 302 is waiting for the second event data 122B to arrive and the second composition operation 302 is waiting for another type of event data 122 to arrive. In this example, if the second event data 122B arrives and the first composition operation 302 uses data stored in the rally point 306 to help create new composition event data 304, the reference count of the rally point 306 can be decremented from two to one. If the other type of event data 122 expected by the second composition operation 302 arrives later, the second composition operation 302 can also use the data stored in the rally point 306 to help create composition event data 304, and the reference count of the rally point 306 can be decremented to zero. When the reference count reaches zero, the compute engine 102 can delete the rally point 306 or mark the rally point 306 for later deletion to clear local or cloud storage space.

In some examples, a rally point 306 can be created with a lifetime value. In some cases, first event data 122A expected by a composition operation 302 may arrive such that a rally point 306 is created. However, second event data 122A expected by the composition operation 302 may never arrive, or may not arrive within a timeframe that is relevant to the composition operation 302. Accordingly, if a rally point 306 is stored for longer than its lifetime value, the compute engine 102 can delete the rally point 306 or mark the rally point 306 for later deletion to clear local or cloud storage space. Additionally, in some examples, a rally point 306 may be stored while a certain process is running, and be deleted when that process terminates. For example, a rally point 306 may be created and stored when a first process executes a command line, but the rally point 306 may be deleted when the first process terminates. However, in other examples, a rally point 306 associated with a process may continue to be stored after the associated process terminates, for example based on reference counts, a lifetime value, or other conditions as described above.

In some situations, a composition operation 302 that expects first event data 122A followed by second event data 122B may receive two or more instances of the first event data 122A before receiving any instances of the second event data 122B. Accordingly, in some examples, a rally point 306 can have a queue of event data 122 that includes data taken from one or more instances of the first event data 122A. When an instance of the second event data 122B arrives, the compute engine 102 can remove data from the queue of the rally point 306 about one instance of the first event data 122A and use that data to create composition event data 304 along with data taken from the instance of the second event data 122B. Data can be added and removed from the queue of a rally point 306 as instances of the first event data 122A and/or second event data 122B arrive. In some examples, when the queue of a rally point 306 is empty, the compute engine 102 can delete the rally point 306 or mark the rally point 306 for later deletion to clear local or cloud storage space.

Figure 4:
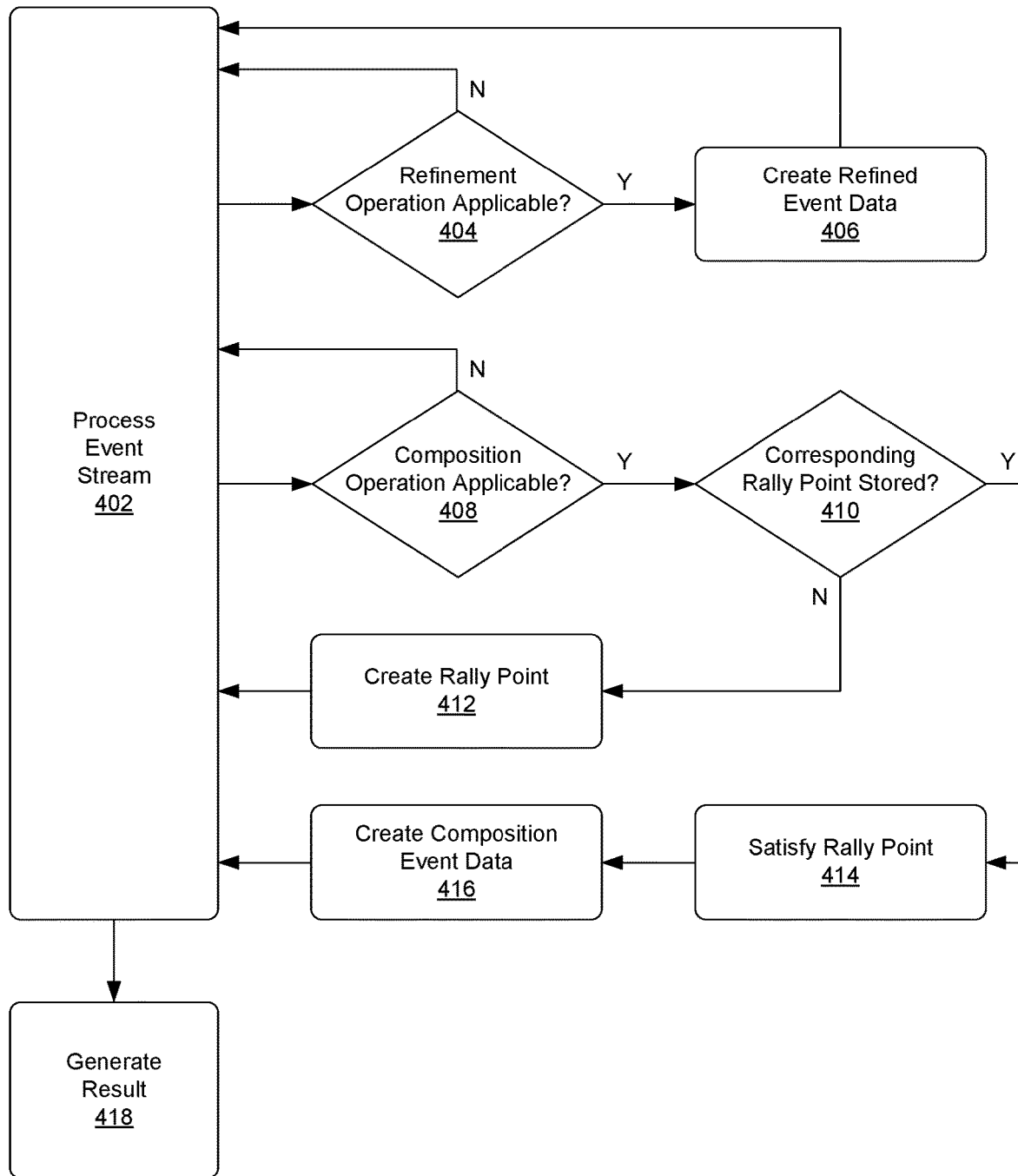
FIG. 4 depicts a flowchart of operations that can be performed by an instance of a compute engine in a distributed security system.

FIG. 4 depicts a flowchart of example perations that can be performed by an instance of the compute engine 102 in the distributed security system 100. At block 402, the compute engine 102 can process an event stream of event data 122. The event data 122 may have originated from an event detector 124 of a security agent 108 that initially detected or observed the occurrence of an event on a client device 104, and/or may be event data 122 that has been produced using refinement operations 202 and/or composition operations 302 by the compute engine 102 or a different instance of the compute engine 102. In a local instance of the compute engine 102, in some examples the event stream may be received from a bus 126 or local memory on a client device 104. In a cloud instance of the compute engine 102, in some example the event stream may be received via the storage engine 116.

At block 404, the compute engine 102 can determine whether a refinement operation 202 applies to event data 122 in the event stream. As discussed above, the event data 122 may be formatted according to a context collection format 136, and accordingly contain data elements or other information according to an ontological definition 134 of the context collection format 136. A refinement operation 202 may be associated with filter criteria that indicates whether information in the event data 122 is associated with the refinement operation 202. If information in the event data 122 meets the filter criteria, at block 406 the compute engine 102 can generate refined event data 204 that includes a filtered subset of the data elements from the event data 122. The compute engine 102 can add the refined event data 204 to the event stream and return to block 402 so that the refined event data 204 can potentially be processed by other refinement operations 202 and/or composition operations 302.

At block 408, the compute engine 102 can determine if a composition operation 302 applies to event data 122 in the event stream. As discussed above with respect to FIG. 3, the compute engine 102 may have criteria indicating when a composition operation 302 applies to event data 122. For example, the criteria may indicate that the composition operation 302 applies when event data 122 associated with a child process of a certain parent process is received, and/or that the composition operation 302 expects first event data 122 of a child process of the parent process to be received followed by second event data 122 of a child process of the parent process. If a composition operation 302 is found to apply to event data 122 at block 408, the compute engine 102 can move to block 410.

At block 410, the compute engine 102 can determine if a rally point 306 has been generated in association with the event data 122. If no rally point 306 has yet been generated in association with the event data 122, for example if the event data 122 is the first event data 122A as shown in FIG. 3, the compute engine 102 can create a rally point 306 at block 412 to store at least some portion of the event data 122, and the compute engine 102 can return to processing the event stream at block 402.

However, if at block 410 the compute engine 102 determines that a rally point 306 associated with the event data 122 has already been created and stored, for example if the event data 122 is the second event data 122B shown in FIG. 3 and a rally point 306 was previously generated based on earlier receipt of the first event data 122A shown in FIG. 3, the rally point 306 can be satisfied at block 414. The compute engine 102 can satisfy the rally point at block 414 by extracting data from the rally point 306 about other previously received event data 122, and in some examples by decrementing a reference count, removing data from a queue, and/or deleting the rally point 306 or marking the rally point 306 for later deletion. At block 416, the compute engine 102 can use the data extracted from the rally point 306 that had been taken from earlier event data 122, along with data from the newly received event data 122, to generate new composition event data 304. The compute engine 102 can add the composition event data 304 to the event stream and return to block 402 so that the composition event data 304 can potentially be processed by refinement operations 202 and/or other composition operations 302.

At block 418, the compute engine 102 can generate a result from event data 122 in the event stream. For example, if the event stream includes, before or after refinement operations 202 and/or composition operations 302, event data 122 indicating that one or more events occurred that match a behavior pattern 142, the compute engine 102 can generate and output a result indicating that there is a match with the behavior pattern 142. In some examples, the result can itself be new event data 122 specifying that a behavior pattern 142 has been matched.

For example, if event data 122 in an event stream originally indicates that two processes were initiated, refinement operations 202 may have generated refined event data 204 indicating that those processes include a web browser parent process that spawned a notepad child process. The refined event data 122 may be reprocessed as part of the event stream by a composition operation 302 that looks for event data 122 associated with child processes spawned by web browser parent process. In this example, the composition operation 302 can generate composition event data 304 that directly indicates that event data 122 associated with one or more child processes spawned by the same parent web browser process has been found in the event stream. That new composition event data 304 generated by the composition operation may be a result indicating that there has been a match with a behavior pattern 142 associated with a web browser parent process spawning both a child notepad process.

In some examples, when a result indicates a match with a behavior pattern 142, the compute engine 102, or another component of the distributed security system 100, can take action to nullify a security threat associated with the behavior pattern 142. For instance, a local security agent 108 can block events associated with malware or cause the malware to be terminated. However, in other examples, when a result indicates a match with a behavior pattern 142, the compute engine 102 or another component of the distributed security system 100 can alert users, send notifications, and/or take other actions without directly attempting to nullify a security threat. In some examples, the distributed security system 100 can allow users to define how the distributed security system 100 responds when a result indicates a match with a behavior pattern 142. In situations in which event data 122 has not matched a behavior pattern 142, the result generated at block 418 can be an output of the processed event stream to another element of the distributed security system 100, such as to the security network 106 and/or to another instance of the compute engine 102.

As shown in FIG. 4 a compute engine 102 can process event data 122 in an event stream using one or more refinement operations 202 and/or one or more composition operations 302 in any order and/or in parallel. Accordingly, the order of the refinement operation 202 and the composition operation 302 depicted in FIG. 4 is not intended to be limiting. For instance, as discussed above, new event data 122 produced by refinement operations 202 and/or composition operations 302 can be placed into an event stream to be processed by refinement operations 202 and/or composition operations 302 at the same instance of the compute engine 102, and/or be placed into an event stream for another instance of the compute engine 102 for additional and/or parallel processing.

Figure 5:
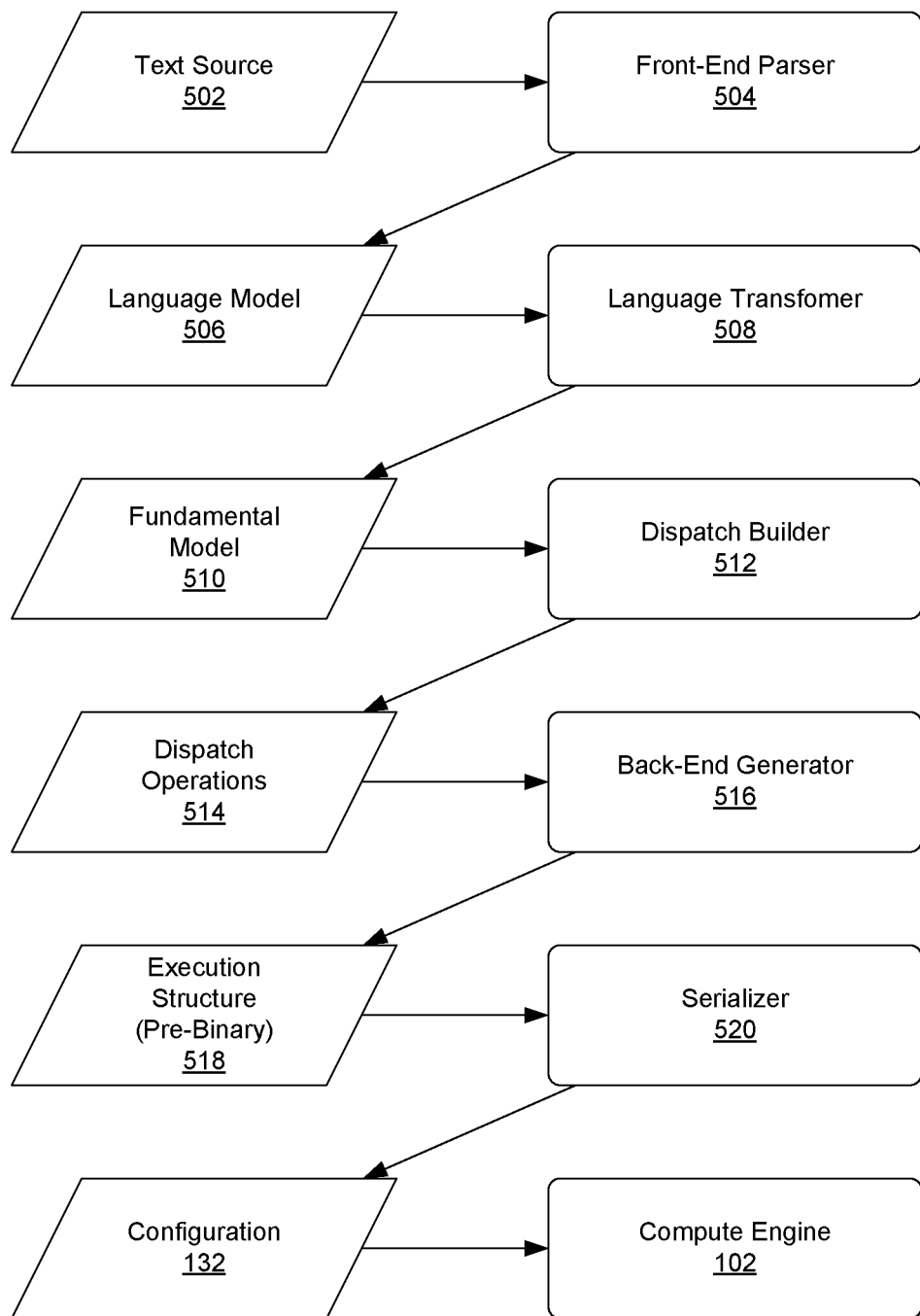
FIG. 5 depicts an example of elements of a compiler processing different types of data to generate a configuration for instances of a compute engine.

FIG. 5 depicts an example of elements of a compiler 114 processing different types of data to generate a configuration 132 for instances of the compute engine 102. As shown in FIG. 5, the compiler 114 can receive at least one text source 502 that includes a description of an event or pattern of events to be detected by the compute engine 102. The compiler 114 can identify a behavior pattern 142, or a combination of behavior patterns 142, from the pattern repository 112, and use those one or more behavior patterns 142 to build instructions for the compute engine 102 in a configuration 132 that cause the compute engine 102 to look for, refine, and/or combine event data 122 to determine whether event data 122 matches target behavior of interest. For example, the compiler 114 can generate instructions for the compute engine 102 that cause the compute engine 102 to use refinement operations 202 and/or composition operations 302 to make corresponding comparisons on event data 122. The compiler 114 can generate the instructions in the configuration 132 such that the compute engine 102 processes and/or generates event data 122 according to ontological definitions 134.

In some examples, the compiler 114 can accordingly decompose a comprehensive text description of a behavior of interest, and decompose that comprehensive description into smaller refinements and/or compositions that together make up the overall behavior of interest. The compiler 114 can generate instructions for these smaller refinements and compositions that can cause a compute engine 102 to perform matching operations to determine when such smaller refinements and compositions apply within a stream of event data 122. Based on such matches, the instructions can also cause the compute engine 102 to use refinement operations 202 and/or composition operations 302 to iteratively build event data 122 that ultimately matches the full behavior of interest when that behavior of interest has occurred. Accordingly, a user can provide a text description of a behavior of interest, and the compiler 114 can automatically generate a corresponding executable configuration 132 for instances of compute engine 102, without the user writing new source code for the compute engine 102.

A front-end parser 504 of the compiler 114 can transform the text source 502 into language expressions of an internal language model 506. A language transformer 508 of the compiler 114 can then use a series of steps to transform the language expressions of the internal language model 506 into a fundamental model 510. The fundamental model 510 can express operations, such as refinement operations 202 and/or composition operations 302, that can be executed by the compute engine 102 as described above with respect to FIGS. 2 and 3.

For example, the language transformer 508 can resolve behavior references in language expressions of the language model 506 to identify and/or index behaviors described by the text source 502. Next, the language transformer 508 can eliminate values and/or computations in behavioral expressions that rely on optionality, by creating distinct and separate variants of the behavioral expressions that can be followed depending on whether a particular value is present at runtime. The language transformer 508 can also eliminate conditional expressions in the behavioral expressions by transforming the conditional expressions into multiple distinct behavioral expressions. Additionally, the language transformer 508 can eliminate Boolean expressions in logical expressions within behavioral expressions, by transforming them into multiple alternative behavioral expressions for the same fundamental behavior. Finally, the language transformer 508 can perform refinement extraction and composition extraction to iteratively and/or successively extract fundamental refinements and/or fundamental compositions from the behavioral expressions until none are left. The extracted fundamental refinements and fundamental compositions can define a fundamental model 510 for the compute engine 102, and can correspond to the refinement operations 202 and/or composition operations 302 discussed above with respect to FIGS. 2 and 3.

After the language transformer 508 has generated a fundamental model 510 containing fundamental refinements and/or fundamental compositions, a dispatch builder 512 of the compiler 114 can generate one or more dispatch operations 514 for the compute engine 102 based on the fundamental model 510. Overall, the dispatch builder 512 can transform declarative definitions of behaviors in the fundamental model 510 into a step-by-step execution dispatch model expressed by dispatch operations 514, For example, the dispatch builder 512 can identify and extract public behaviors from the fundamental model 510 that have meaning outside a runtime model. The dispatch builder 512 can also transform refinements from the fundamental model 510 by extracting logical conditions from behavior descriptions of the fundamental model 510 and converting them into logical pre-conditions of execution steps that build behaviors through refinement. Similarly, the dispatch builder 512 can transform compositions from the fundamental model 510 by extracting and transforming descriptive logical conditions into pre-conditions for execution. The dispatch builder 512 may also transform identified compositions into a form for the storage engine 116 in association with rally points 306, Once the dispatch builder 512 has extracted and/or transformed public behaviors, refinements, and/or compositions, the dispatch builder 512 can combine the dispatches by merging corresponding execution instructions into a set of dispatch operations 514. In some examples, the dispatch builder 512 can express the combined dispatches using a dispatch tree format that groups different operations by class for execution.

After the dispatch builder 512 has generated dispatch operations 514 from the fundamental model 510, for example as expressed in a dispatch tree, a back-end generator 516 of the compiler 114 can transform the dispatch operations 514 into an execution structure 518 using a pre-binary format, such as a JavaSciipt Object Notation (JSON) representation. The pre-binary format can be a flat, linear representation of an execution structure 518. In some examples, a three-address code form can be used to flatten the execution structure 518, such that a hierarchical expression can be converted into an expression for at least temporary storage.

For example, the back-end generator 516 can flatten a dispatch tree produced by the dispatch builder 512 to flatten and/or rewrite the dispatch tree to have a single level with inter-tree references. The back-end generator 516 may also transform random-access style references in such inter-tree references to a linearized representation suitable for binary formats. The back-end generator 516 can build context collection formats 136 by transforming references into context collection formats 136 for new behavior production into indexed references. The back-end generator 516 can also construct a three-address form for the execution structure 518 by decomposing and transforming multi-step expressions into instructions that use temporary registers. The back-end generator 516 can additionally construct the execution structure 518 in a pre-binary format, such as a JSON format, by transforming each type of instruction to a representation in the pre-binary format.

After the back-end generator 516 has generated an execution structure 518 using the pre-binary format, such as a JSON format, a serializer 520 of the compiler 114 can generate configuration 132 for the compute engine 102 by converting the execution structure 518 from the pre-binary format into a binary format. The compiler 114 can output the generated configuration 132 to instances of the compute engine 102. A compute engine 102 can then follow instructions in the configuration 132 to execute corresponding operations, such as refinement operations 202 and/or composition operations 302, as described above with respect to FIGS. 2-4. The generated configuration 132 may accordingly be an executable configuration 132 that any instance of the compute engine 102 can use to execute instructions defined in the configuration 132, even though the compute engine 102 itself has already been deployed and/or is unchanged apart from executing the new executable configuration 132.

As an example, in the process of FIG. 5, a user may provide a text description of a behavior of interest via a user interface associated with the pattern repository 112 or other element of the distributed security system 100. The description of the behavior of interest may indicate that the user wants the distributed security system 100 to look for network connections to a target set of IP addresses. In these examples, the compiler 114 can generate instructions for refinement operations 202 and/or composition operations 302 that would cause the compute engine 102 to review event data 122 for all network connections, but generate new event data 122, such as refined event data 204 and/or composition event data 304, when the event data 122 is specifically for network connections to one of the target set of IP addresses. That new event data 122 indicating that there has been a match with the behavior of interest can be output by the compute engine 102 as a result, as discussed above with respect to block 418 of FIG. 4.

Additionally, when an initial text description of a behavior of interest involves a set of events that may occur across a set of client devices 104, the compiler 114 can generate instructions for local instances of the compute engine 102 to perform refinement operations 202 and/or composition operations 302 on certain types of event data 122 locally, and instructions for cloud instances of the compute engine 102 to perform refinement operations 202 and composition operations 302 on event data 122 reported to the security network 106 from multiple client devices 104 to look for a broader pattern of events across the multiple client devices 104. Accordingly, although the compiler 114 can generate configurations 132 that can be executed by both local and cloud instances of the compute engine 102, which specific instructions from a configuration 132 that a particular instance of the compute engine 102 executes may depend on where that instance is located and/or what event data 122 it receives.

Bounding Manager

Figure 6:
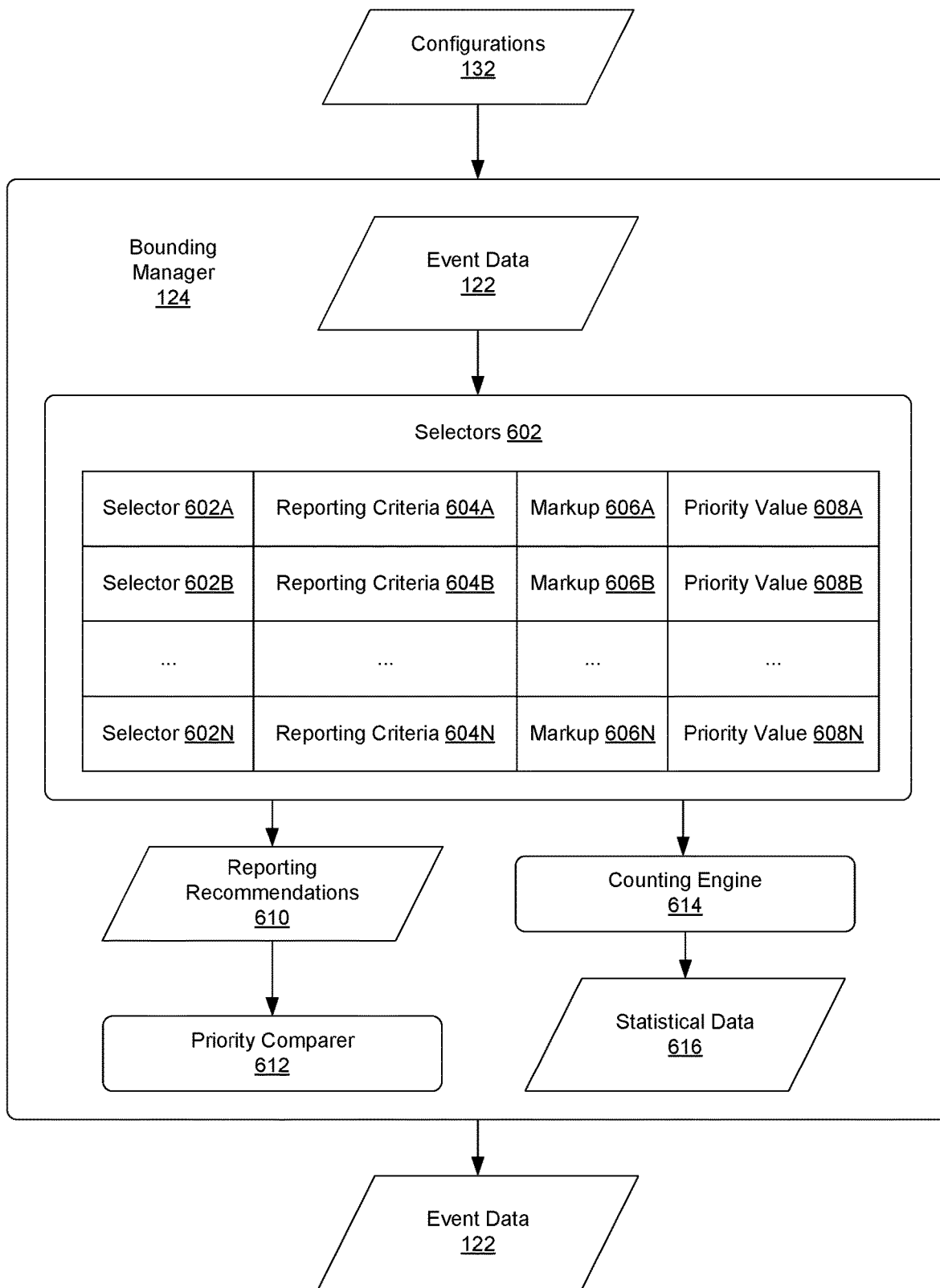
FIG. 6 depicts an example data flow in a bounding manager of a security agent.

FIG. 6 depicts an example data flow in a bounding manager 128 of a security agent 108. The bounding manager 128 can be a gatekeeper within a local security agent 108 that controls how much and/or what types of event data 122 the security agent 108 sends to the security network 106. Although event detectors 124, a compute engine 102, and/or other elements of the security agent 108 add event data 122 to a bus 126 or other memory location such that a communication component 130 can send that event data 122 to the security network 106, a bounding manager 128 may limit the amount and/or types of event data 122 that is ultimately sent to the security network 106. For example, a bounding manager 128 can intercept and/or operate on event data 122 on a bus 126 and make a determinization as to whether the communication component 130 should, or should not, actually send the event data 122 to the security network 106.

For example, when a security agent 108 is processing networking events associated with one or more processes running on a client device 104, a bounding manager 128 in the security agent 108 may limit event data 122 that is sent to the security network 106 to only include information about unique four-tuples in network connection events, data about no more than a threshold number of networking events per process, data about no more than a threshold number of networking events per non-browser process, no more than a threshold number of networking events per second, or data limited by any other type of limitation.

As another example, if a security agent 108 detects three hundred networking events per minute that occur on a client device 104, but the bounding manager 128 is configured to allow no more than one hundred networking events per minute to be sent to the security network 106, the bounding manager 128 may accordingly limit the security agent 108 to sending event data 122 about a sample of one hundred networking events drawn from the full set of three hundred networking events, and thereby avoid submitting event data 122 about the full set of three hundred networking events to the security network 106. This can reduce how much event data 122 cloud elements of the distributed security system 100 store and/or process, while still providing event data 122 to the cloud elements of the distributed security system 100 that may be relevant to, and/or representative of, activity of interest that is occurring on the client device 104.

In some examples, event data 122 intercepted and operated on by the bounding manager 128 can be original event data 122 about events observed or detected on the client device 104 by one or more event detectors 124 of the security agent 108. In other examples, event data 122 intercepted and operated on by the bounding manager 128 can be event data 122 produced by an instance of the compute engine 102, such as event data 122 produced by refinement operations 202 and/or composition operations 302. In some examples, the bounding manager 128 can be an enhancer located on a bus 126 that can intercept or operate on event data 122 from the bus 126 before the event data 122 reaches other elements of the security agent 108 that may operate on the event data 122.

A bounding manager 128 can operate according to bounding rules provided by the bounding service 118 in one or more configurations 132. Bounding rules can be defined through one or more selectors 602 that can be implemented by a bounding manager 128 as will be discussed further below, such that a bounding manager 128 can apply bounding rules by processing event data 122 from an event stream using one or more associated selectors 602. As discussed above, a bounding manager 128 can be provided with a configuration 132 generated based on an ontological definition 134 of a context collection interface 138, such that the bounding manager 128 can process event data 122 formatted using any context collection format 136 that includes at least the data elements of the context collection interface 138, if an interface fulfillment map 140 corresponds to the context collection format 136 and the context collection interface 138.

In some examples, configurations 132 for a bounding manager 128 can be sent from the security network 106 as one or more channel files. In some examples, the distributed security system 100 can use different categories of channel files, including global channel files, customer channel files, customer group channel files, and/or agent-specific channel files.

Global channel files can contain global bounding rules that are to be applied by bounding managers 128 in all security agents 108 on all client devices 104. Customer channel files can contain customer-specific bounding rules that are to be applied by bounding managers 128 in security agents 108 on client devices 104 associated with a particular customer. For example, a particular customer may want more information about a certain type of event or pattern of events that the customer believes may be occurring on the customer's client devices 104. Corresponding customer-specific bounding rules can thus be generated that may cause bounding managers 128 to allow more event data 122 about that type of event or pattern of events to be sent to cloud elements of the distributed security system 100. The customer-specific bounding rules can be pushed, via customer channel files, to security agents 108 executing on the customer's client devices 104. Customer group channel files can be similar channel files containing bounding rules that are specific to a particular group or type of customers.

Agent-specific channel files can contain bounding rules targeted to specific individual security agents 108 running on specific individual client devices 104. For example, if it is suspected that a particular client device 104 is being attacked by malware or is the focus of another type of malicious activity, agent-specific channel files can be generated via the bounding service 118 and be sent to the security agent 108 running on that particular client device 104. In this example, the agent-specific channel files may provide a bounding manager 128 with new or adjusted bounding rules that may result in more, or different, event data 122 being sent to the security network 106 that may be expected to be relevant to the suspected malicious activity. In some examples, an agent-specific channel file can include an AID or other unique identifier of a specific security agent 108, such that the agent-specific channel file can be directed to that specific security agent 108.

Accordingly, a bounding service 118 can use different types of channel files to provide bounding managers 128 of different security agents 108 with different sets of bounding rules. For example, a bounding service 118 may provide all security agents 108 with general bounding rules via global channel files, but may also use customer, customer group, and/or agent-specific channel files to provide additional targeted bounding rules to subsets of security agents 108 and/or individual security agents 108. In such cases, a bounding manager 128 may operate according to both general bounding rules as well as targeted bounding rules. In some examples, a bounding manager 128 can restart, or start a new instance of the bounding manager 128, that operates according to a new combination of bounding rules when one or more new channel files arrive.

In some examples, a bounding service 118 or other cloud element of the distributed security system 100 can also, or alternately, send specialized event data 122 to a client device 104 as a configuration 132 for a bounding manager 128. In these examples, the specialized event data 122 can include data about new bounding rules or modifications to bounding rules. A bounding manager 128 can intercept or receive the specialized event data 122 as if it were any other event data 122, but find the data about new or modified bounding rules and directly implement those new or modified bounding rules. For example, although configurations 132 for a bounding manager 128 provided through one or more channel files make take seconds or minutes for a bounding manager 128 to begin implementing, for instance if the bounding manager 128 need to receive and evaluate new channel files, determine how new channel files interact with previous channel files, and/or restart the bounding manager 128 or start a new instance of the bounding manager 128 in accordance with a changed set of channel files, or if the bounding service 118 itself takes time to build and deploy channel files, the bounding manager 128 may be configured to almost immediately implement new or modified bounding rules defined via specialized event data 122. As an example, a bounding service 118 can provide specialized event data 122 to a local security agent 108 that causes that security agent's bounding manager 128 to directly turn off or urn on application of a particular bounding rule or corresponding selector 602, and/or directly adjust one or more parameters of one or more selectors 602.

As noted above, bounding rules can be defined through one or more selectors 602 that a bounding manager 128 can apply by processing event data 122 from an event stream using one or more selectors 602 associated with the event data 122. Each selector 602 can be associated with reporting criteria 604, markup 606, and/or a priority value 608. Each selector 602 can be an algorithm that can generate an independent reporting recommendation 610 about whether a piece of event data 122 should be sent to the security network 106. In some examples, different selectors 602 can operate on the same piece of event data 122 and provide conflicting reporting recommendations 610 about that piece of event data 122. However, the bounding manager 128 can include a priority compares 612 that can evaluate priority values 608 associated with the different selectors 602 and/or their reporting recommendations 610 to make a final decision about whether or not to send the piece of event data 122 to the security network 106. The bounding manager 128 can also include a counting engine 614 that can track statistical data 616 about event data 122.

Individual selectors 602 may operate on event data 122, or groups of event data 122 based on attributes in the event data 122. For example, a selector 602 can be configured to operate on individual event data 122 or a group of event data 122 when the event data 122 includes a certain process ID, is associated with a certain behavior pattern 142, includes a certain keyword or other target value, matches a certain event type, and/or matches any other attribute associated with the selector 602. As an example, a selector 602 can be configured to operate on event data 122 when the event data 122 is for a DNS request about a specific domain name. However, a piece of event data 122 may include attributes that match multiple selectors 602, such that more than one selector 602 can operate on that piece of event data 122. For example, event data 122 for a DNS request to a certain domain name may be operated on by a first selector 602 associated with all networking events, a second selector 602 associated more specifically with DNS requests, and a third selector 602 specifically associated with that domain name.

A reporting recommendation 610 generated by a selector 602 can be based on reporting criteria 604 associated with that selector 602. A selector's reporting recommendation 610 can be a positive, a negative, or a neutral recommendation. In some examples, reporting criteria 604 for a selector 602 can include upper and/or lower bounds of reporting rates or overall counts regarding how much of a certain type of event data 122 should be sent to the security network 106. For example, reporting criteria 604 can indicate that event data 122 about a certain type of event should be sent to the security network 106 at least fifty times an hour, but no more than three hundred times an hour. As another example, reporting criteria 604 can indicate that a sample of five hundred instances of a certain type of event data 122 should be sent to the security network 106, after which no more instances of that type of event data 122 need be sent to the security network 106. Accordingly, the counting engine 614 can track statistical data 616 associated with one or more individual selectors 602 about how much corresponding event data 122 has been sent to the security network 106, such that a selector 602 can use the statistics to determine if new event data 122 meets reporting criteria 604 when making a reporting recommendation 610.

A positive reporting recommendation 610 can indicate that a selector 602 recommends that a piece of event data 122 should be sent to the security network 106. For example, if reporting criteria 604 for a selector 602 indicates that at least fifty pieces of a certain type of event data 122 should be sent to the security network 106 over a certain period of time, and statistical data 616 tracked by the counting engine 614 indicates that only thirty pieces of that type of event data 122 has been sent to the security network 106 over that period of time, the selector 602 can make a positive reporting recommendation 610 recommending that a new piece of event data 122 of that type be sent to the security network 106.

A negative reporting recommendation 610 can indicate that a selector 602 has determined that a piece of event data 122 should be bounded, and accordingly should not be sent to the security network 106. For example, if reporting criteria 604 for a selector 602 indicates that five hundred instances of a certain type of event data 122 should be sent to the security network 106 overall, and statistical data 616 tracked by the counting engine 614 indicates that five hundred instances of that type of event data 122 have already been sent to the security network 106, the selector 602 can make a negative reporting recommendation 610 recommending that a new piece of event data 122 of that type not be sent to the security network 106.

A neutral reporting recommendation 610 can indicate that a selector 602 has no preference about whether or not to send a piece of event data 122 to the security network 106. For example, if reporting criteria 604 for a selector 602 indicates that between fifty and one hundred pieces of a certain type of event data 122 should be sent to the security network 106 over a certain period of time, and statistical data 616 tracked by the counting engine 614 indicates that sixty pieces of that type of event data 122 has already been sent to the security network 106 over that period of time, the selector 602 can make a neutral reporting recommendation 610 because the statistical data 616 shows that matching event data 122 between the upper and lower bounds of the selector's reporting criteria 604 has already been sent to the security network 106 during the period of time. In some examples, a selector 602 may also make a neutral reporting recommendation 610 if the selector 602 does not apply to the type of a certain piece of event data 122.

If a selector 602 generates a positive reporting recommendation 610 for a piece of event data 122, the selector 602 can also add markup 606 associated with the selector 602 to the event data 122. The markup 606 can be a reason code, alphanumeric value, text, or other type of data that indicates why the selector 602 recommended that the event data 122 be sent to the security network 106. Each selector 602 that generates a positive reporting recommendation 610 for a piece of event data 122 can add its own unique markup to the event data 122. Accordingly, if more than one selector 602 recommends sending a piece of event data 122 to the security network 106, the piece of event data 122 can be given markup 606 indicating more than one reason why the piece of event data 122 is being recommended to be sent to the security network 106. In some examples, markup 606 from different selectors 602 can be aggregated into a bitmask or other format that is sent to the security network 106 as part of, or in addition to, the event data 122.

Each selector 602 can also provide a priority value 608 along with its reporting recommendation 610, whether the reporting recommendation 610 is positive, negative, or neutral. In some examples, the priority value 608 associated with a selector 602 can be a static predefined value. For instance, a selector 602 may be configured to always make a reporting recommendation 610 with a specific priority value 608. In other examples, the priority value 608 associated with a selector 602 can be dynamically determined by the selector 602 based on an analysis of event data 122 and/or statistical data 616. For example, if a selector's reporting criteria 604 has a lower bound indicating that at least one hundred pieces of a type of event data 122 should be sent to the security network 106 per hour, but statistical data 616 indicates that only ten pieces of that type of event data 122 have been sent to the security network 106 during the current hour, the selector 602 can produce a positive reporting recommendation 610 with a high priority value 608 in an attempt to increase the chances that the event data 122 is ultimately sent to the security network 106 and the lower bound of the selector's reporting criteria 604 will be met. In contrast, if the statistical data 616 instead indicates that seventy-five pieces of that type of event data 122 have been sent to the security network 106 during the current hour, and thus that the lower bound of the selector's reporting criteria 604 is closer to being met, the selector 602 can produce a positive reporting recommendation 610 with a lower priority value 608.

As mentioned above, a priority comparer 612 can compare priority values 608 of selectors 602 or their reporting recommendations 610 to make an ultimate determination as to whether or not the bounding manager 128 should send a piece of event data 122 to the security network 106. For example, if a first selector 602 with a priority value 608 of "1000" makes a negative reporting recommendation 610 because a maximum amount of event data 122 about networking events has already been sent to the security network 106 in the past day, but a second selector 602 with a priority value 608 of "600" makes a positive reporting recommendation 610 because that selector 602 recommends sending additional event data 122 specifically about IP connections, the priority comparer 612 can determine that the negative reporting recommendation 610 from the higher-priority first selector 602 should be followed. Accordingly, in this example, the security agent 108 would not send event data 122 to the security network 106 despite the positive reporting recommendation 610 from the lower-priority second selector 602. In some examples, the priority comparer 612 can be configured to disregard neutral reporting recommendations 610 from selectors 602 regardless of their priority values 608.

In some examples, the priority comparer 612 can add a bounding decision value to a bounding state field in event data 122. The bounding decision value can be a value, such as binary yes or no value, that expresses the ultimate decision from the priority comparer 612 as to whether the security agent 108 should or should not send the event data 122 to the security network 106. The priority comparer 612 can then return the event data 122 to a bus 126 in the security agent 108, or modify the event data 122 in the bus 126, such that the event data 122 can be received by a communication component 130 of the security agent 108. The communication component 130 can use a Boolean expression or other operation to check if the bounding state field in the event data 122 indicates that the event data 122 should or should not be sent to the security network 106, and can accordingly follow the bounding decision value in that field to either send or not send the event data 122 to the security network 106. In other examples, the priority comparer 612 may discard event data 122 from the bus 126 that the priority comparer 612 decides should not be sent to the security network 106, such that the communication component 130 only receives event data 122 that the priority comparer 612 has determined should be sent to the security network 106.

As discussed above, one or more selectors 602 that made positive reporting recommendations 610 can have added markup 606 to the event data 122 indicating reasons why those selectors 602 recommended sending the event data 122 to the security network 106. Accordingly, cloud elements of the distributed security system 100 can review that markup 606 to determine one or more reasons why the event data 122 was sent to the security network 106, and, in some examples, can store and/or route the event data 122 within the security network 106 based on the reasons identified in the markup 606.

In some examples, if a selector 602 makes a reporting recommendation 610 that is overruled by another reporting recommendation 610 from a higher-priority selector 602, the bounding manager 128 can update data associated with the selector 602 to indicate why the selector's reporting recommendation 410 was overruled. For example, a table for a particular selector 602 may indicate that the particular selector 602 processed event data 122 for five hundred events and recommended that three hundred be bounded, but that ultimately event data 122 for four hundred events was sent to the security network 106 due to higher-priority selectors 602. Accordingly, such data can indicate a full picture of why certain event data 122 was or was not sent to the security network 106 because of, or despite, a particular selector's reporting recommendation 410. In some examples, the bounding manager 128 can provide this type of data to the security network 106 as diagnostic data, as event data 122, or as another type of data.

While the bounding manager 128 can cause less than a full set of event data 122 to be sent to the security network 106 based on reporting recommendations 410 as described above, in some situations the bounding manager 128 can also send statistical data 616 about a set of event data 122 to the security network 106 instead of event data 122 directly. This can also decrease the amount of data reported to the security network 106.

For example, the counting engine 614 can be configured to count instances of certain types of event data 122 that pass through the bounding manager 128. The counting engine 614 can generate statistical data 616 that reflects such a count, and emit that statistical data 616 as event data 122, or another type of data or report, that the security agent 108 can send to the security network 106. Accordingly, the security network 106 can receive a count of the occurrences of a type of event as a summary, without receiving different individual pieces of event data 122 about individual occurrences of that type of event.

As an example, if cloud elements of the distributed security system 100 are configured to determine how many, and/or how often, files are accessed on one or more client devices 104, the cloud elements many not need detailed event data 122 about every individual file access event that occurs on the client devices 104. As another example, registry events may occur thousands of times per minute, or more, on a client device 104. While it may be inefficient or costly to send event data 122 about each individual registry event to the security network 106, it may be sufficient to simply send the security network 106 a count of how many such registry events occurred over a certain period of time. Accordingly, a configuration 132 may instruct the counting engine 614 to, based on event data 122, generate statistical data 616 including a count of the number of certain types of event occurrences on a client device 104 over a period of time. The security agent 108 can then send the statistical data 616 reflecting the overall count of such event occurrences to the security network 106 as event data 122, or another type of report, instead of sending event data 122 about each individual event occurrence to the security network 106.

In some examples, statistical data 616 can trigger whether event data 122 about individual event occurrences or an overall count of those event occurrences is sent to the security network 106. For example, the counting engine 614 can determine if a count of certain event occurrences reaches a threshold over a period of time. If the count reaches the threshold, the counting engine 614 can cause the security agent 108 to send the count instead of event data 122 about individual event occurrences. However, if the count does not reach the threshold, the counting engine 614 can cause the security agent 108 to send the event data 122 about individual event occurrences. In still other examples, the counting engine 614 can be configured to always cause a count of certain event occurrences to be sent to the security network 106, but be configured to wait to send such a count until the count reaches a certain threshold value, on a regular basis, or on demand by the storage engine 116 or other element of the distributed security system 100.

In some examples, if a new channel file or other type of configuration 132 arrives while a counting engine 614 has already generated counts or other statistical data 616, the bounding manager 128 can initiate a second instance of the counting engine 614 that operates according to the new configuration 132 and perform a state transfer from the old instance of the counting engine 614 to the new instance of the counting engine 614. For example, a new agent-specific channel file may arrive that, in combination with previously received global and/or customer channel files, would change how the counting engine 614 counts events or generates other statistical data 616. Rather than terminating the existing instance of the counting engine 614 that was generating statistical data 616 based on an old set of configurations 132 and losing already-generated statistical data 616 from that instance of the counting engine 614, the bounding manager 128 may initiate a second instance of the counting engine 614 that generates statistical data 616 based on the new combination of configurations 132.

In some examples, a state transfer can then allow the new instance of the counting engine 614 to take over and build on previously generated statistical data 616 from the older instance of the counting engine 614. In other examples, the new instance of the counting engine 614 may run in parallel with the older instance of the counting engine 614 for at least a warm-up period to learn the state of the previously generated statistical data 616. For example, due to modified and/or new data types in a new configuration 132, previous statistical data 616 generated by the old instance of the counting engine 614 may not be directly transferrable to the new instance of the counting engine 614 that operates based on the new configuration 132. However, during a warm-up period, the new instance of the counting engine 614 can discover or learn information that is transferrable from the older statistical data 616.

In some examples, configurations 132 may be provided that define new selectors 602, modify existing selectors 602, and/or enable or disable specific selectors 602. In some examples, a configuration 132 can enable or disable certain selectors 602 immediately or for a certain period of time. For example, if the storage engine 116 or other cloud elements of the distributed security system 100 are becoming overloaded due to security agents 108 sending too much event data 122 to the security network 106, the bounding service 118 can push a configuration 132 to a security agent 108 that immediately causes selectors 602 to provide negative reporting recommendations 610 or with different priority values 608 such that the security agent 108 reduces or even stops sending event data 122 for a set period of time or until a different configuration 132 is received. For instance, a configuration 132 may be used to immediately cause a certain selector 602 that applies to all types of event data 122 to provide a negative reporting recommendations 610 with a highest-possible priority value 608 for all event data 122, such that the priority comparer 612 will follow that negative reporting recommendation 610 and block all event data 122 from being sent to the security network 106 for a period of time.

As another example, a configuration 132 can be provided that causes the bounding manager 128 to immediately cause event data 122 to be sent to the security network 106 when a particular selector's reporting criteria 604 is met, without going through the process of the priority comparer 612 comparing priority values 608 of different reporting recommendations 610 about that event data 122.

In some examples, the bounding service 118 can provide a user interface that allows users to define new selectors 602 and/or modify reporting criteria 604, markup 606, priority values 608, and/or other attributes of selectors 602 for a new configuration 132 for a bounding manager 128. In some examples, the bounding service 118 can provide templates that allows users to adjust certain values associated with selectors 602 for bounding managers 128 of one or more security agents 108, and the bounding service 118 can then automatically create one or more corresponding configurations 132 for those security agents 108, such as global channel files, customer channel files, or agent-specific channel files.

Configurations that 132 that change, enable, or disable selectors 602 can also be used by the experimentation engine 120 to adjust reporting levels of certain types of event data 122 permanently or during a test period. For example, if a certain type of event data 122 is expected to be relevant to an experiment, the experimentation engine 120 can cause a configuration 132 for bounding managers 128 to be pushed to one or more security agents 108 that provide new or modified selectors 602 that at least temporarily increase the amount of that targeted type of event data 122 that gets sent to the security network 106. In some cases, the configuration 132 can be provided to security agents 108 of one or more client devices 104 that are part of an experiment, such as individual client devices 104, a random sample of client devices 104, or a specific group of client devices 104. After a certain period or time, or after enough of the target type of event data 122 has been collected for the experiment, previous configurations 132 can be restored to return the security agents 108 to reporting event data 122 at previous reporting rates.

Additionally, as discussed above, individual selectors 602 that make positive reporting recommendations 610 can add corresponding markup 606 to event data 122 to indicate reasons why the event data 122 was recommended to be sent to the security network 106. When one or more selectors 602 are associated with an experiment run via the experimentation engine 120, those selectors 602 can provide markup 606 indicating that event data 122 was recommended to be sent to the security network 106 because it is associated with the experiment. Accordingly, when the event data 122 arrives at the storage engine 116, the event data 122 can include markup 606 from one or more selectors 602, potentially including selectors 602 associated with an experiment in addition to selectors 602 that are not directly associated with the experiment. The storage engine 116 may use markup 606 from the experiment selectors 602 to store or route the event data 122 to cloud elements associated with the experiment, as well as storing or routing the same event data 122 to other elements that are not associated with the experiment based on other non-experiment markup 606.

Figure 7:
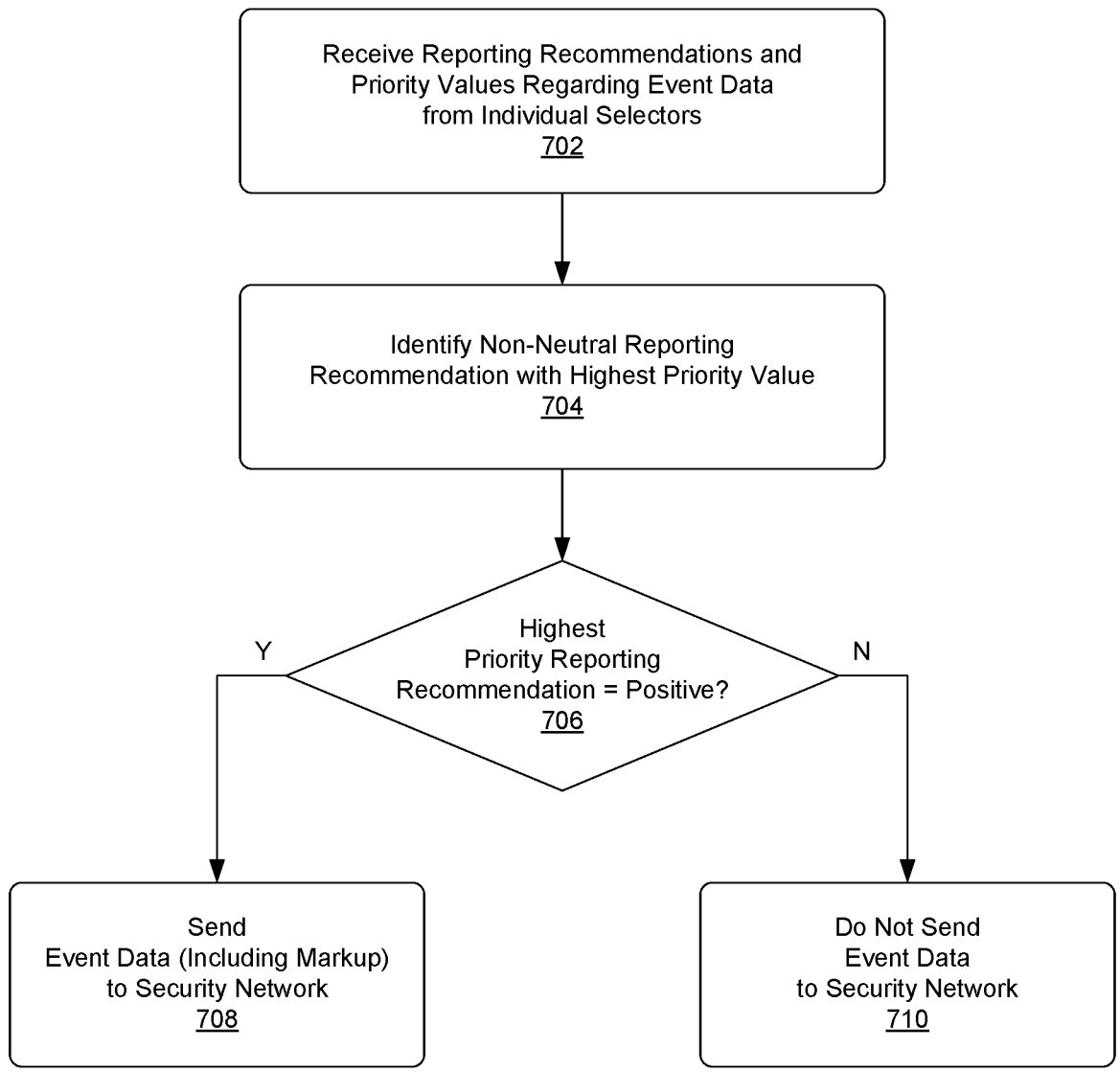
FIG. 7 depicts a flowchart of an example process by which a priority comparer of a bounding manager can determine whether or not a security agent should send event data to the security network.

FIG. 7 depicts a flowchart of an example process by which a priority comparer 612 of a bounding manager 128 can determine whether or not a security agent 108 should send event data 122 to the security network 106.

At block 702, the priority comparer 612 can receive a set of reporting recommendations 610 produced by different selectors 602 of the bounding manager 128 for a piece of event data 122. Each reporting recommendation 610, or the selector 602 that produced the reporting recommendation 610, can be associated with a priority value 608.

At block 704, the priority comparer 612 can identify a non-neutral reporting recommendation 610 that is associated with the highest priority value 608 among the set of reporting recommendations 610. Because reporting criteria 604 of selectors 602 that made neutral reporting recommendations 610 can be satisfied regardless of whether the event data 122 is ultimately sent to the security network 106, the priority comparer 612 may disregard neutral reporting recommendations 610 at block 704 regardless of their priority values 608, and only consider priority values 608 of positive reporting recommendations 610 and negative reporting recommendations 610.

At block 706, the priority comparer 612 can determine whether the highest-priority reporting recommendation 610 is positive. If the highest-priority reporting recommendation 610 is positive, at block 708 the priority comparer 612 can cause the event data 122 to be sent to the security network 106. For example, based on the decision by the priority comparer 612, the bounding manager 128 can release the event data 122 to a bus 126 of the security agent 108, which in turn can cause the security agent 108 to send the event data 122 to the security network 106. Here, even if one or more negative reporting recommendations 610 were also made by selectors 602, a positive reporting recommendation 610 can overrule those negative reporting recommendations 610 when it has the highest priority value 608.

The event data 122 that is sent to the security network 106 at block 708 can include markup 606 associated with at least one selector 602 indicating why that selector 602 made a positive reporting recommendation 610. If more than one selector 602 made a positive reporting recommendation 610, the event data 122 that is sent to the security network 106 can include markup 606 from a set of selectors 602 that made positive reporting recommendations 610. Accordingly, even though only one reporting recommendation 410 has the highest priority value 608, the event data 122 ultimately sent to the security network 106 can include markup 606 from one or more selectors 602. In some examples, if one or more selectors 602 that made positive reporting recommendations 610 have not already added corresponding markup 606 to the event data 122, the bounding manager 128 can add markup 606 associated with those selectors 602 before the event data 122 is sent to security network 106 at block 708.

When event data 122 is sent to the security network 106 at block 708, the counting engine 614 can also update statistical data 616 about that type of event data 122 to indicate how much of, and/or how often, that type of event data 122 has been sent to the security network 106. This updated statistical data 616 can in turn be used by selectors 602 to make reporting recommendations on subsequent event data 122.

If the priority comparer 612 instead determines at block 706 that the highest-priority reporting recommendation 610 is negative, at block 710 the priority comparer 612 can cause the bounding manager 128 to discard the event data 122 or otherwise prevent the event data 122 from being sent by the security agent 108 to the security network 106, for example by adding a bounding value to a bounding decision field that causes other elements of the security agent 108 to not send the event data 122 to the security network 106. In this situation, even if one or more lower-priority selectors 602 made positive reporting recommendations 610 and/or added markup 606 to the event data 122 about why the event data 122 should be sent, the higher priority value 608 of the negative reporting recommendation 610 can be determinative such that the security agent 108 does not send the event data 122 to the security network 106.

Storage Engine

Figure 8:
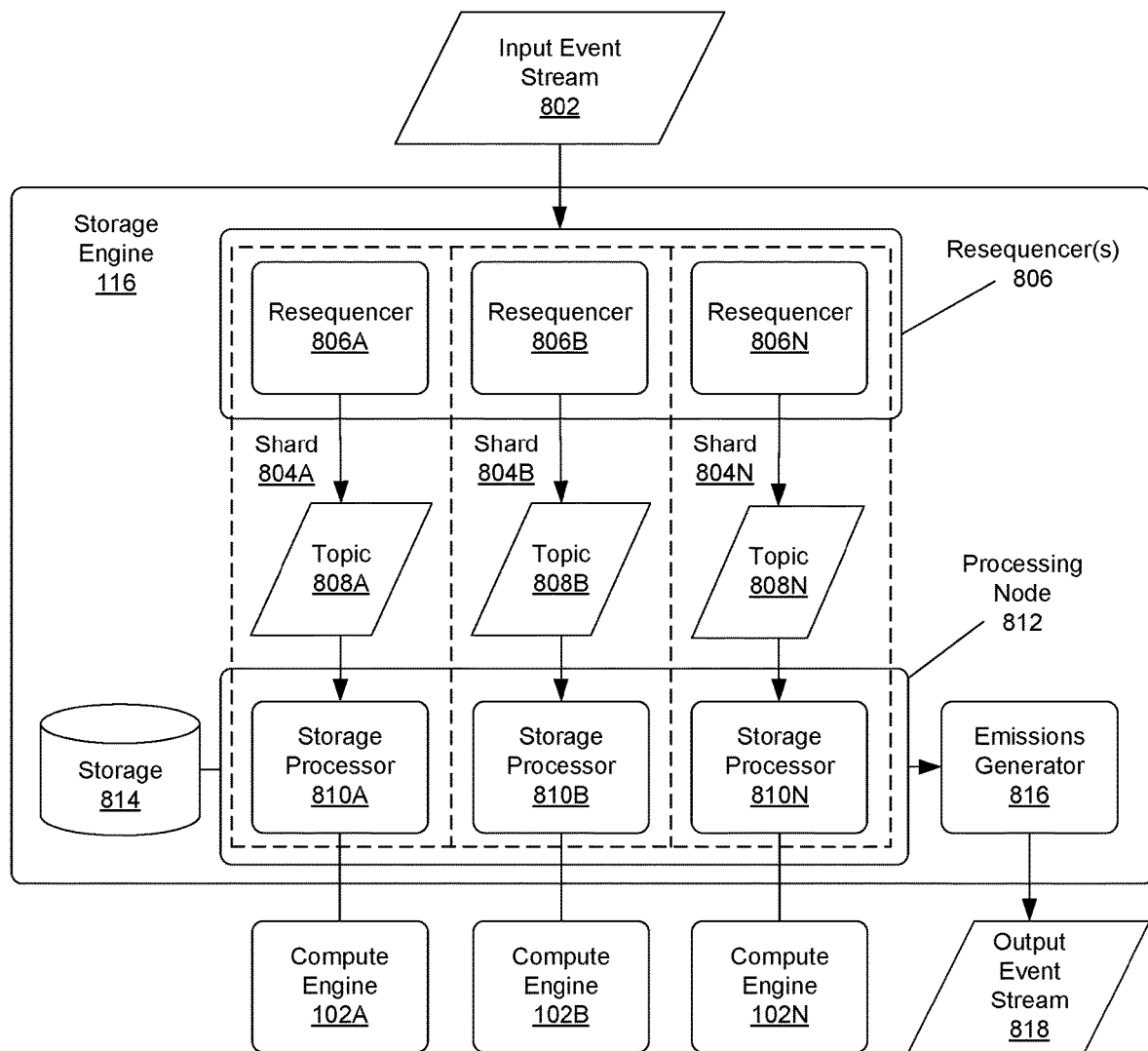
FIG. 8 depicts an example of data flow in a storage engine of the security network.

FIG. 8 depicts an example of data flow in a storage engine 116 of the security network 106. An input event stream 802 of event data 122 sent to the security network 106 by one or more local security agents 108 can be received by a storage engine 116 in the security network 106, as shown in FIG. 1. In some examples, security agents 108 can send event data 122 to the security network 106 over a temporary or persistent connection, and a termination service or process of the distributed security system 100 can provide event data 122 received from multiple security agents 108 to the storage engine 116 as an input event stream 802.

The event data 122 in the input event stream 802 may be in a random or pseudo-random order when it is received by the storage engine 116. For example, event data 122 for different events may arrive at the storage engine 116 in the input event stream 802 in any order without regard for when the events occurred on client devices 104. As another example, event data 122 from security agents 108 on different client devices 104 may be mixed together within the input event stream 802 when they are received at the storage engine 116, without being ordered by identifiers of the security agents 108. However, the storage engine 116 can perform various operations to sort, route, and/or store the event data 122 within the security network 106.

The storage engine 116 can be partitioned into a set of shards 804. Each shard 804 can be a virtual instance that includes its own resequencer 806, topic 808, and/or storage processor 810, Each shard 804 can also be associated with a distinct cloud instance of the compute engine 102. For example, if the storage engine 116 includes ten thousand shards 804, there can be ten thousand resequencers 806, ten thousand topics 808, ten thousand storage processors 810, and ten thousand cloud instances of compute engines 102.

Each shard 804 can have a unique identifier, and a particular shard 804 can be associated with one or more specific security agents 108. In some examples, a particular instance of the compute engine 102 can be associated with a specific shard 804, such that it is configured to process event data 122 from specific security agents 108 associated with that shard 804. However, in some examples, cloud instances of the compute engine 102 can also be provided that are specifically associated with certain rally points 306 associated with corresponding composition operations 302, such that the cloud instances of the compute engine 102 can execute composition operations 302 that may expect or process different pieces of event data 122 generated across one or more client devices 104 using such rally points 306.

Resequencers 806 of one or more shards 804 can operate in the storage engine 116 to sort and/or route event data 122 from the input event stream 802 into distinct topics 808 associated with the different shards 804. The topics 808 can be queues or sub-streams of event data 122 that are associated with corresponding shards 804, such that event data 122 in a topic 808 for a shard 804 can be processed by a storage processor 810 for that shard 804.

In some examples, event data 122 from the input event stream 802 can be received by one resequencer 806 in a cluster of resequencers 806 that are associated with different shards 804. That receiving resequencer 806 can determine, based on an AID or other identifier of the security agent 108 that sent the event data 122, whether that resequencer 806 is part of the shard 804 that is specifically associated with that security agent 108. If the receiving resequencer 806 is part of the shard 804 associated with the sending security agent 108, the resequencer 806 can route the event data 122 to the topic 808 for that shard 804. If the resequencer 806 that initially receives event data 122 determines that it is not part of the shard 804 associated with the sending security agent 108, the resequencer 806 can forward the event data 122 to a different resequencer 806 that is part of the shard 804 associated with the sending security agent 108. In some examples, a resequencer 806 can send event data 122 to another resequencer 806 via a remote procedure command (RPC) connection or channel.

A resequencer 806 can determine whether event data 122 is associated with the shard 804 of the resequencer 806, or is associated with a different shard 804, based on an identifier, such as an AID, of the security agent 108 that sent the event data 122. For example, the resequencer 806 can perform a modulo operation to divide an AID value in event data 122 by the number of shards 804 in the storage engine 116, find the remainder of the division, and find a shard 804 with an identifier that matches the remainder. As an example, when there are ten thousand shards 804 in the storage engine 116 and a remainder of a modulo operation on a security agent's AID is "60," the resequencer 806 can determine that the security agent 108 is associated with a shard 804 having an identifier of "60," If that resequencer 806 is part of shard "60," the resequencer 806 can route the event data 122 to a topic 808 associated with shard "60." However, if the resequencer 806 is not part of shard "60," the resequencer 806 can use an RPC connection or other type of connection to forward the event data 122 to another resequencer 806 that is associated with shard "60."

In some examples, if a first resequencer 806 attempts to forward event data 122 from a security agent 108 to a second resequencer 806 that is part of a different shard 804 associated with that security agent 108, the second resequencer 806 may be offline or be experiencing errors. In this situation, the storage engine 116 can reassign the security agent 108 to the shard 804 associated with the first resequencer 806, or to another backup shard 804. Accordingly, the event data 122 can be processed by elements of a backup shard 804 without waiting for the second resequencer 806 to recover and process the event data 122.

In some examples, a resequencer 806 may also order event data 122 by time or any other attribute before outputting a batch of such ordered event data 122 in a topic 808 to a corresponding storage processor 810. For example, when a resequencer 806 determines that it is the correct resequencer 806 for event data 122, the resequencer 806 can temporarily place that event data 122 in a buffer of the resequencer 806, Once the size of data held in the buffer reaches a threshold size, and/or event data 122 has been held in the buffer for a threshold period of time, the resequencer 806 can re-order the event data 122 held in the buffer by time or any other attribute, and output a batch of ordered event data 122 from the buffer to a topic 808.

After event data 122 from the input event stream 802 has been sorted and partitioned by resequencers 806 into topics 808 of different shards 804, storage processors 810 of those different shards 804 can further operate on the event data 122. Example operations of a storage processor 810 are described below with respect to FIG. 10. In some examples, a single processing node 812, such as a server or other computing element in the security network 106, can execute distinct processes or virtual instances of storage processors 810 for multiple shards 804.

After a storage processor 810 for a shard 804 has operated on event data 122, the storage processor 810 can output event data 122 to a corresponding cloud instance of the compute engine 102 associated with the shard 804. In some examples, each storage processor 810 executing on a processing node 812 can initiate, or be associated, with a corresponding unique instance of the compute engine 102 that executes on the same processing node 812 or a different processing node 812 in the security network 106. As described further below, in some examples the storage processor 810 can also output event data 122 to short-term and/or long-term storage 814, and/or to an emissions generator 816 that prepares an output event stream 818 to which other cloud elements of the distributed security system 100 can subscribe.

Figure 9:
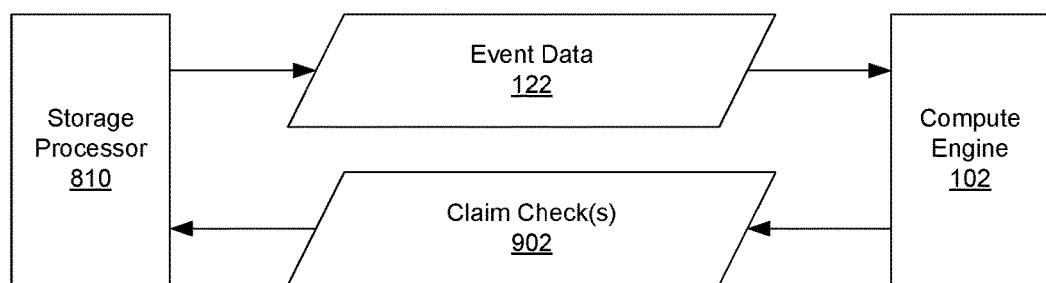
FIG. 9 depicts an example of a storage processor sending event data to a corresponding compute engine.

FIG. 9 depicts an example of a storage processor 810 sending event data 122 to a corresponding compute engine 102. As described above, the compute engine 102 can process incoming event data 122 based on refinement operations 202, composition operations 302, and/or other operations. However, in some examples, the compute engine 102 may not initially be able to perform one or more of these operations on certain event data 122. For example, if a particular operation of the compute engine 102 compares attributes in event data 122 about different processes to identify which parent process spawned a child process, the compute engine 102 may not be able to perform that particular operation if the compute engine 102 has received event data 122 about the child process but has not yet received event data 122 about the parent process.

In these types of situations, in which the compute engine 104 receives first event data 122 but expects related second event data 122 to arrive later that may be relevant to an operation, the compute engine 104 can issue a claim check 902 to the storage processor 810. The claim check 902 can indicate that the compute engine 104 is expecting second event data. 122 to arrive that may be related to first event data 122 that has already arrived, and that the storage processor 810 should resend the first event data 122 to the compute engine 104 along with the second event data 122 if and when the second event data 122 arrives. In some examples, the claim check 902 can identify the first and/or second event data 122 using a key, identifier, string value, and/or any other type of attribute.

Accordingly, once a compute engine 102 has sent a claim check 902 for second event data 122 that may be related to first event data 122, the compute engine 102 may be configured to disregard the first event data 122 if and until the related second event data 122 actives or a threshold period of time passes. For example, if the storage processor 810 determines that second event data 122 corresponding to a claim check 902 has arrived, the storage processor 810 can send that second event data 122 to the compute engine 104 along with another copy of the first event data 112 such that the compute engine 104 can process the first event data 112 and the second event data 122 together. As another example, the storage processor 810 may wait for the expected second event data 122 for a threshold period of time, but then reseed the first event data 122 to the compute engine 102 if the threshold period of time passes without the expected second event data 122 arriving. Accordingly, in this situation the compute engine 102 can move forward with processing the first event data 122 without the second event data 122.

In some examples, a claim check 902 can depend on, or be related to, one or more other claim checks 902. For example, when event data 122 about a child process arrives, a compute engine 102 may issue a claim check 902 for event data 122 about a parent process. However, the compute engine 102 may additionally issue a separate claim check 902 for event data about a grandparent process, a parent process of the parent process. Accordingly, in this example, a storage processor 810 can wait to provide the compute engine 102 with event data 122 about the child process, the parent process, and the grandparent process until that event data 122 has arrived and both related claim checks 902 have been satisfied. Similarly, it multiple claim checks 902 have been issued that are waiting for the same expected event data 122, a storage processor 810 can respond to those multiple claim checks 902 at the same time if and when the expected event data 122 arrives. In some examples, a storage processor 810 can generate a dependency graph of pending claim checks 902 that depend on each other, such that the storage processor 810 can perform a breadth-first search or other traversal of the dependency graph when event data 722 arrives to find claim checks 902 pending against related event data 122.

In some examples, claim checks 902 can be processed by the storage engine and/or the compute engine 104 at run-time, for example when laim checks 902 are issued, to determine dependencies between claim checks 902, and to determine when claim checks 902 are satisfied. In contrast, in some examples, the rally points 306 discussed above with respect to composition operations 306 executed by compute engines 102 can be evaluated and determined at compile time, such as to generate configurations 132 for compute engines 102 that define storage requirements for rally points 306 and indicate triggers and other instructions for when and how to create rally points 306.

Figure 10:
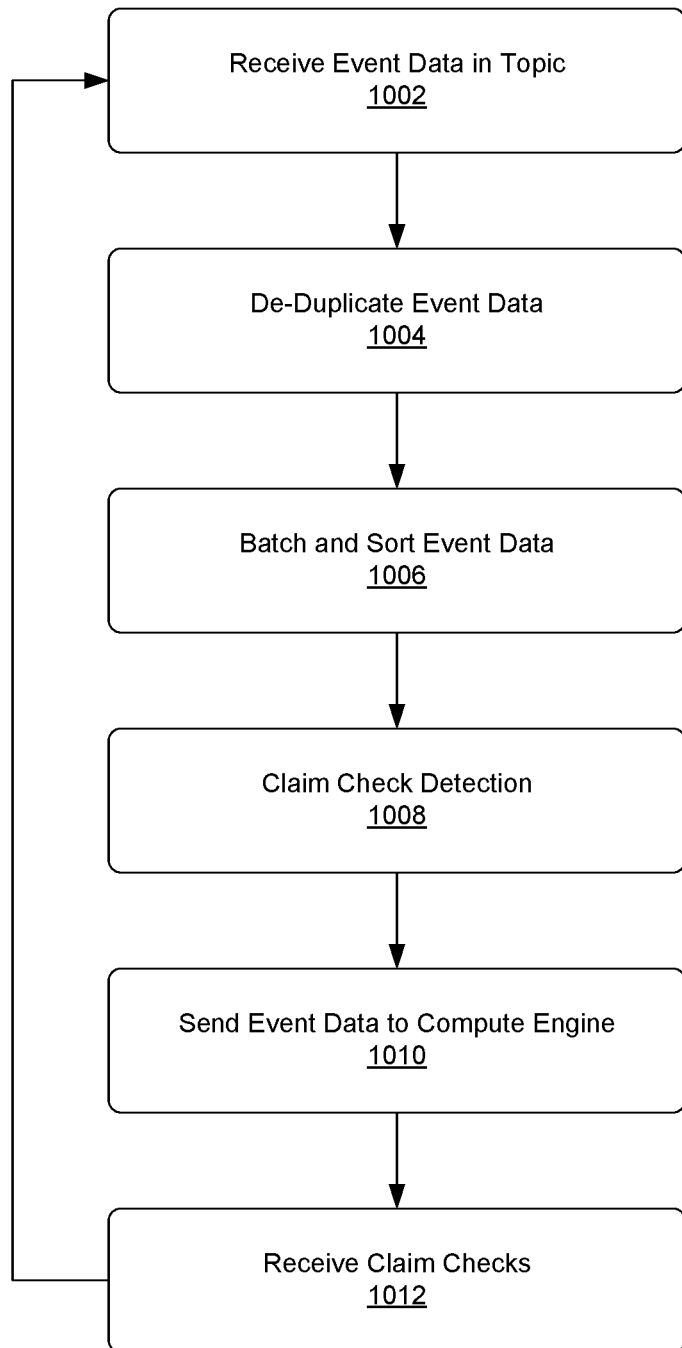
FIG. 10 depicts a flowchart of example operations that can be performed by a storage processor in a storage engine.

FIG. 10 depicts a flowchart of example operations that can be performed by a storage processor 810 in a storage engine 116. At block 1002, the storage processor 810 can receive event data 122 in a topic 808 from a resequencer 806.

At block 1004, the storage processor 810 can perform de-duplication on the event data 122 from the topic 808. For example, if the topic 808 contains duplicate copies of certain event data 122, and/or the storage processor 810 already operated on another copy of that event certain event data 122 in the past, the duplicate copy can be discarded from the storage engine 116 and not be processed further by the distributed security system 100. Here, because event data 122 is sorted and routed into topics 808 and corresponding storage processors 810 based on an identifier of the security agent 108 that sent the event data 122, copies of the same event data 122 can be routed to the same storage processor 810. Accordingly, there can be a confidence level that different storage processors 810 are not operating on separate copies of the same event data 122, and that the particular storage processor 810 associated with event data 122 from a particular security agent 108 can safely discard extra copies of duplicated event data 122 from that particular security agent 108.

At block 1006, the storage processor 810 can perform batching and/or sorting operations on event data 122 from a topic 808. For example, even if a resequencer 806 for a shard 804 released batches of event data 122 into a topic 808, and each individual batch from the resequencer 806 was sorted by time, a first batch may contain event data 122 about an event that occurred on a client device 104 after an event described by event data 122 in a second batch. Accordingly, the storage processor 810 can reorder the event data 122 from the topic if they are not fully in a desired order. The storage processor 810 can also sort and/or batch event data 122 from a topic 808 based on event type, behavior type, and/or any other attribute.

At block 1008, the storage processor 810 can detect if any event data 122 received via the topic 808 matches a claim check 902 previously issued by the compute engine 102. As discussed above, the compute engine 102 can issue claim checks 902 for event data 122 expected to arrive at later points in time. Accordingly, at block 1008, storage processor 810 can determine if matches are found for any pending claims checks 902. If newly received event data 122 matches an existing claim check 902, the storage processor 810 can retrieve any other event data 122 that corresponds to the claim check 902 and prepare to send both the newly received event data 122 and the other corresponding event data 122 to the compute engine 102 at block 1010. For example, if a compute engine 102, after receiving first event data 122, issued a claim check 902 for second event data 122 related to the first event data 122, and the storage processor 810 determines at block 1008 that the second event data 122 has arrived, the storage processor 810 can retrieve the first event data 122 from storage 814 or other memory and prepare to send both the first event data 122 and the second event data 122 to the compute engine 102 at block 1010.

As discussed above, in some examples the storage processor 810 can build a dependency graph or other representation of multiple related claim checks 902. Accordingly, at block 1008 the storage processor 810 can use a dependency graph or other representation of related claim checks 902 to determine if related claim checks 902 have been satisfied. If event data 122 has arrived that satisfy dependent or related claim checks 902, the storage processor 810 can prepare to send the corresponding related event data 122 to the compute engine 102 at block 1010.

At block 1010, the storage processor 810 can send event data 122 to the compute engine 102. As noted above, the event data 122 sent at block 1010 can include both new event data 122 from a topic as well as any older event data 122 that is to be resent to the compute engine 102 based on one or more claim checks 902. In some examples, the storage processor 810 can use an RPC connection or channel to send a batch or stream of event data 122 to the compute engine 102.

At block 1012, the storage processor 810 can receive and/or register new claim checks 902 from the compute engine 102. The storage processor 810 can then return to block 1002 to receive new event data 122 from the topic 808.

The order of the operations shown in FIG. 10 is not intended to be limiting, as some of the operations may occur in parallel and/or different orders. For example, a storage processor 810 can receive and/or register new claim checks 902 from the compute engine 102 before, after, or while de-duplicating, sorting, and/or batching event data 122.

Figure 11:
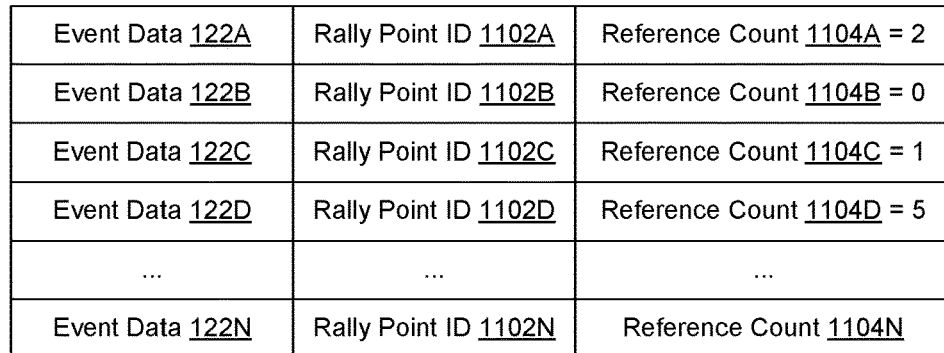
FIG. 11 depicts an example of event data associated with a storage engine.

FIG. 11 depicts an example of event data 122 associated with a storage engine 116. As discussed above with respect to FIG. 8, event data 122 that has passed through storage processors 810 can be stored in short-term and/or long-term storage 814. In some examples, cloud instances of the compute engine 102 that operate on event data 122 and/or produce new event data 122 using refinement operations 202, composition operations 302, and/or other operations can also output processed event data 122 to be stored in the storage 814, either directly or through the storage processors 810. The storage 814 can include one or more memory devices, and the event data 122 can be stored in a database or other structure in the storage 814.

Each piece of event data 122 can be stored in the storage 814 so that it is available to be retrieved and used by elements of the distributed security system 100. For example, when a storage processor 810 receives a claim check 902 from a compute engine 102 for a second piece of event data 122 that is expected to arrive in relation to a first piece of event data 122 that has already arrived, the storage processor 810 may store the first piece of event data 122 in storage 814 at least temporarily. When the second piece of event data 122 arrives and the claim check 902 is satisfied, or a threshold time period associated with the claim check 902 expires, the storage processor 810 can retrieve the first piece of event data 122 from the storage and resend it to the compute engine 102.

As another example, compute engines 102 and/or other elements of the distributed security system 100 can query the storage 814 to retrieve stored event data 122. For instance, although a certain cloud instance of the compute engine 102 may be associated with one or more specific security agents 108, that cloud instance of the compute engine 102 may query the storage 814 to retrieve event data 122 that originated from other security agents 108 on client devices 104 that are not associated with that cloud instance of the compute engine 102. Accordingly, a cloud instance of the compute engine 102 may be able to access event data 122 from multiple security agents 108 via the storage 814, for instance to detect when events occurring collectively on multiple client devices 104 match a behavior pattern 142. In other examples, elements of the distributed security system 100 can submit queries to the storage engine 116 to obtain event data 122 based on search terms or any other criteria. In some examples, the storage engine 116 can expose an application programming interface (API) through which elements of the distributed security system 100 can submit queries to retrieve event data 122 stored in the storage 814.

In some examples, rally point identifiers 1102 can be stored in the storage 814 in conjunction with pieces of event data 122. As noted above, in some examples certain cloud instances of the compute engine 102 can be associated with certain rally points 306, such that the cloud instances of the compute engine 102 can execute composition operations 302 associated with those rally points 306 based on event data 122 received from one or more client devices 104. Event data 122 can be stored in the storage 814 association with the rally point identifiers 1102 that correspond with different rally points 306 handled by different cloud instances of the compute engine 102. Accordingly, based on rally points identifiers 1102, stored event data 122 associated with rally points 306 can be forwarded to a corresponding cloud instances of the compute engine 102 or other elements associated with those rally points 306. Accordingly, a cloud instance of the compute engine 102 that executes a composition operation associated with a particular rally point 306 can receive event data 122 from the storage engine 116 that may lead to the creation or satisfaction of that rally point 306 as discussed above with respect to FIG. 3.

In some examples, the storage engine 116 can respond to a query from another element of the distributed security system 100 by providing filtered event data 122 that includes less than the full set of fields stored for a piece of event data 122. As discussed above, event data 122 formatted according to a context collection format 136 defined by an ontological definition 134, and in some examples the ontological definition 134 can assign authorization level values to each field of a data type on a field-by-field basis. For instance, some fields can be associated with a high authorization level, while other fields may be associated with one or more lower authorization levels. An element of the distributed security system 100, or a user of such an element, that has the high authorization level may accordingly receive all fields of the event data 122 from the storage engine 116, while another element or user with a lower authorization level may instead only receive a subset of the fields of the event data 122 that corresponds to that element or user's lower authorization level.

The storage 814 can also maintain reference counts 1104 for each piece of event data 122. A reference count 1104 for a piece of event data 122 can be a count of how many other pieces of event data 122 are related to and/or are dependent on that piece of event data 122. Processes that occur on client devices 104 may spawn, or be spawned from, other processes on client devices 104. Although a particular process may terminate on a client device 104 at a point in time, event data 122 about that particular process may remain relevant to evaluating event data 122 about parent or child processes of that particular process that may still be executing on the client device 104. Accordingly, a reference count 1104 can be used to count how many other pieces of event data 122 are related to or dependent on a certain piece of event data 122. The storage engine 116 can be configured to keep event data 122 that has a reference count 1104 above zero, while occasionally or periodically deleting event data 122 that has a reference count 1104 of zero.

As an example, event data 122 about a browser process may arrive at the storage engine 116. At this point, no other process is related to the browser process, so the event data 122 can be given a reference count 1104 of zero. However, if additional event data 122 arrives at the storage engine 116 indicating that the browser process spawned a notepad process as a child process, the reference count 1104 of the browser event data 122 can be incremented to one. If further event data 122 indicates that the browser process also spawned a command shell prompt as a child process, the reference count 1104 of the browser event data 122 can be incremented to two. If event data 122 then indicates that the notepad process has terminated, the reference count 1104 of the browser event data 122 can be decremented down to one. At this point, although the browser event data 122 is older than the notepad event data 122, and/or the browser process may have also terminated, event data 122 about the browser process can be kept in the storage 814 because it is still relevant to understanding how the command shell prompt child process was initiated. When event data 122 indicates that the child command shell prompt has terminated, the reference count 1104 of the browser event data 122 can be decremented to zero. At this point, the storage engine 116 can safely delete the browser event data 122 because no other event data 122 is dependent on the browser event data 122.

In some examples, the storage engine 116 may also be able to update reference counts 1104 for event data 122 by sending heartbeat messages to client devices 104. For example, if a particular instance of event data 122 has been stored in the storage 814 for at least a threshold period of time, the storage engine 116 may send a heartbeat message to a corresponding client device 104 to check if the event data 122 is still relevant. The storage engine 116 can update the event data's reference count 1104 based on a heartbeat response from the client device 104. For example, if event data 122 about a parent process has been stored in the storage 814 for a period of time, and that period of time is longer than a duration after which parent process and/or its child processes may be expected to have terminated, the storage engine 116 may send a heartbeat message to a security agent 108 on a corresponding client device 104 asking if the parent process and/or its child process are still executing on that client device 104. The storage engine 116 may update the reference count 1104 associated with the event data 122 based on a heartbeat response from the client device 104, or lack of a heartbeat response, for example by changing the reference count 1104 to zero if a heartbeat response indicates that the parent process and its child process are no longer executing.

Figure 12:
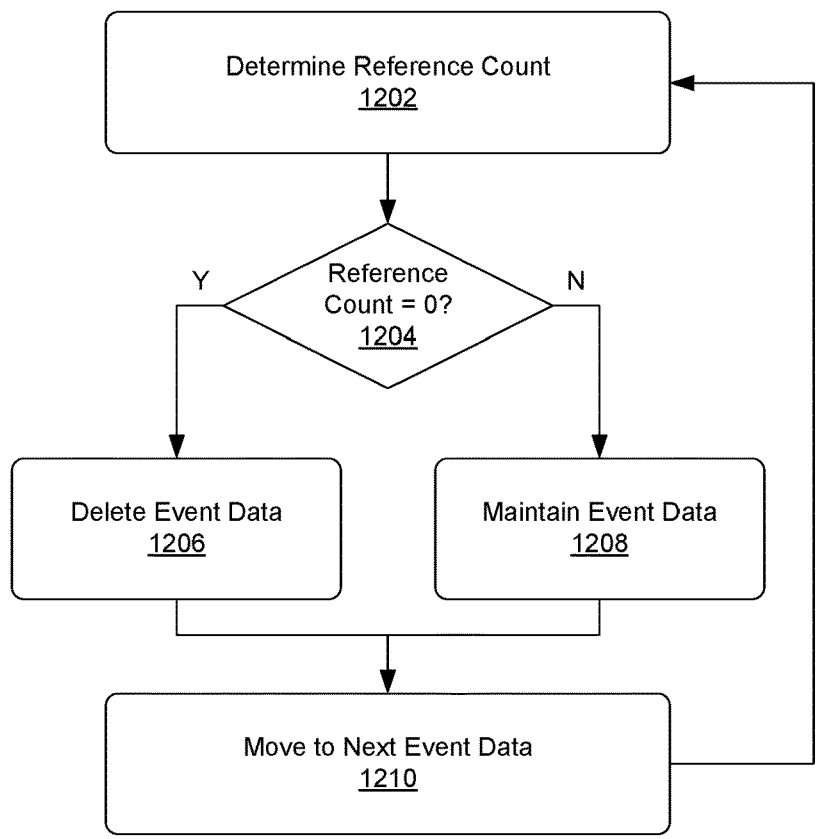
FIG. 12 depicts a flowchart of an example process for cleaning up storage of a storage engine based on reference counts of event data.

FIG. 12 depicts a flowchart of an example process for cleaning up storage 814 of a storage engine 116 based on reference counts 1104 of event data 122. As discussed above, as event data 122 received by the storage engine 116 indicates changing relationships or dependencies between different pieces of event data 122, reference counts 1104 of the event data 122 can be incremented or decremented. Periodically or occasionally the storage engine 116 can perform a clean-up process to delete event data 122 that is not related to any other event data 122, and thus may be more likely to be noise and/or not relevant to security threats associated with broader behavior patterns 142.

At block 1202, the storage engine 116 can determine a reference count 1104 of a piece of event data 122 stored in the storage 814. At block 1204, the storage engine 116 can determine if the reference count 1104 is zero.

If the storage engine 116 determines at block 1204 that a reference count 1104 for event data 122 is zero, in some examples the storage engine 116 can delete that event data 122 from the storage 814 at block 1206. In some examples, the storage engine 116 can be configured to not delete event data 122 at block 1206 unless the event data 112 has been stored in the storage for more than a threshold period of time. For example, if event data 122 about a process was recently added to the storage 814, its reference count 1104 may increase above zero if that process spawns child processes, and as such it may be premature to delete the event data 122. Accordingly, the storage engine 116 can determine if the event data 122 is older than a threshold age value before deleting it at block 1206 when its reference count 1104 is zero. However, in these examples, if event data 122 is older than the threshold age value and has a reference value of zero, the storage engine 116 can delete the event data 122 at block 1206.

If the storage engine 116 determines at block 1204 that a reference count 1104 for event data 122 is above zero, the storage engine 116 can maintain the event data 122 in the storage 814 at block 1208.

At block 1210, the storage engine 116 can move to next event data 122 in the storage 814 and return to block 1202 to determine a reference count of that next event data 122 and delete or maintain the next event data 122 during a next pass through the flowchart of FIG. 12.

Figure 13:
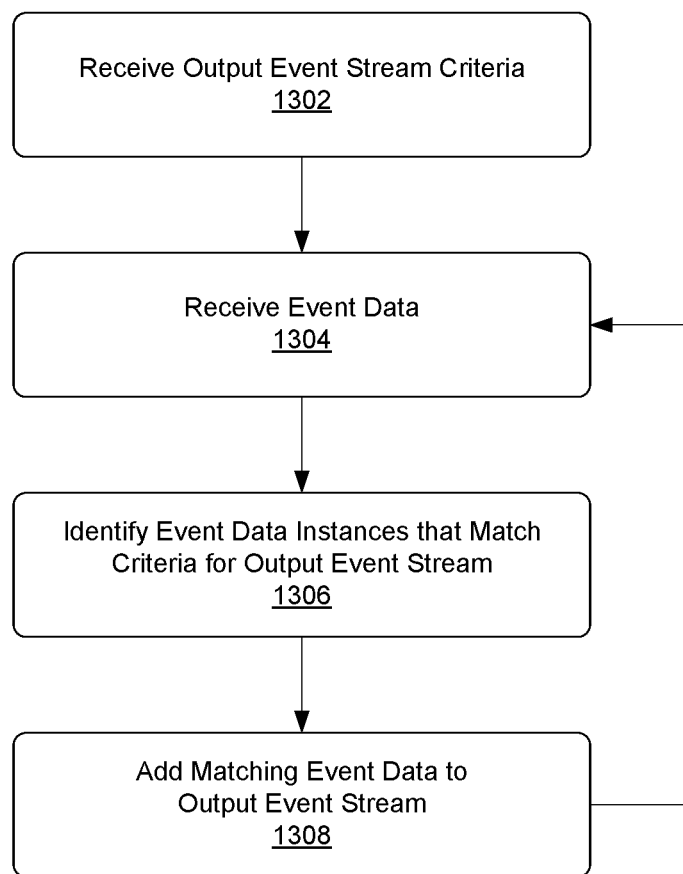
FIG. 13 depicts a flowchart of an example process for an emissions generator of the storage engine to generate an output event stream for one or more consumers.

FIG. 13 depicts a flowchart of an example process for an emissions generator 816 of the storage engine 116 to generate an output event stream 818 for one or more consumers. In some examples, event data 122 processed by one or more shards 804 or corresponding compute engines 102 can be passed to the emissions generator 816 in addition to, or instead of, being stored in the storage 814. For example, the emissions generator 816 can receive copies of event data 122 being output by storage processors to compute engines 102 and/or the storage 814, as well as new or processed event data 122 being output by compute engines 102 back to storage processors 810 and/or to the storage 814. The emissions generator 816 can be configured to use received event data 122 to produce and emit output event streams 818 for consumers. Each output event stream 818 can contain event data 122 that matches corresponding criteria, for example based on one or more shared attributes.

A consumer, such as the experimentation engine 120 or another element of the security network 106, can subscribe to an output event stream 818 such that the element receives a live stream of incoming event data 122 that matches certain criteria. Accordingly, although an element of the security network 106 can query the storage engine 116 on demand to obtain stored event data 122 that matches the query, the element can also subscribe to an output event stream 818 produced by an emissions generator 816 to receive event data 122 that matches certain criteria in almost real time as that event data 122 is processed through the storage engine 116 and/or by compute engines 102. For example, if a user of the experimentation engine 120 wants to receive event data 122 about a certain type of networking event that occurs across a set of client devices 104 as those events occur, the emissions generator 816 can generate and provide an output event stream 818 that includes just event data 122 for occurrences of that type of networking event that are received by the storage engine 116.

As an example, an emissions generator 816 can be configured to produce a customized output event stream 818 based on criteria indicating that a consumer wants a stream of event data 122 related to a process with a particular process ID that includes information about that process's parent and grandparent processes, the first five DNS queries the process made, and the first five IP connections the process made. Accordingly, the consumer can subscribe to that output event stream 818 to obtain matching event data 122 in almost real time as the event data 122 arrives at the storage engine 116, rather than using API queries to retrieve that from the storage 814 at later points in time.

At block 1302, the emissions generator 816 can receive criteria for an output event stream 818. In some examples, the criteria can be default criteria, such that the emissions generator 816 is configured to produce multiple default output event streams 818 using corresponding default criteria. However, the emissions generator 816 can also, or alternately, be configured to produce customized output event streams 818 using criteria defined by consumers, and as such the criteria received at block 1302 can be criteria for a customized output event stream 818.

At block 1304, the emissions generator 816 can receive event data 122 that has been processed by elements of one or more shards 804 and/or corresponding compute engines 102. In some examples, the emissions generator 816 can copy and/or evaluate such event data 112 as the event data 122 is being passed to the storage 814, and/or to or from instances of the compute engine 102.

At block 1306, the emissions generator 816 can identify event data 122 that matches criteria for an output event stream 818. In some examples, the emissions generator 816 can produce multiple output event stream 818 for different consumers, and the emissions generator 816 can accordingly determine if event data 122 matches criteria for different output event streams 818.

At block 1308, the emissions generator 816 can add the matching event data 122 to a corresponding output event stream 818. The output event stream 818 can be emitted by the storage engine 116 or otherwise be made available to other elements of the distributed security system 100, including consumers who have subscribed to the output event stream 818. The emissions generator 816 can return to loop through block 1304 to block 1308 to add subsequent event data 122 that matches criteria to one or more corresponding output event streams 818.

If event data 122 matches criteria for more than one output event stream 818 at block 1306, the emissions generator 816 can add the matching event data 122 to multiple corresponding output event streams 818. If event data 122 does not match any criteria for any output event stream 818, the emissions generator 816 can disregard the event data 122 such that it is not added to any output event streams 818.

Experimentation Engine

Figure 14:
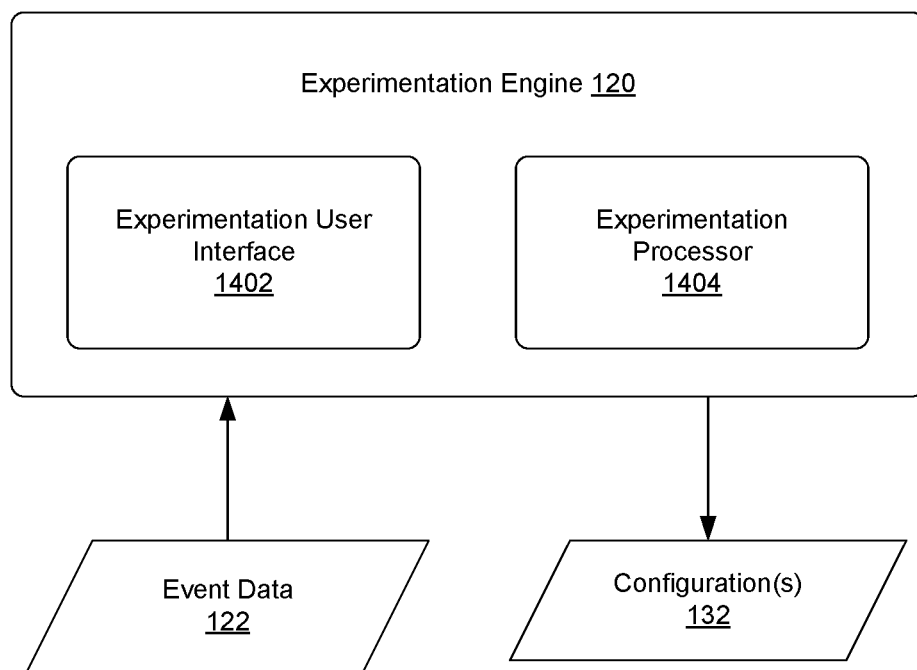
FIG. 14 depicts an example of an experimentation engine.

FIG. 14 depicts an example of an experimentation engine 120. As discussed above, the experimentation engine 120 can be used to produce configurations 132 that may at least temporarily change how other elements of the distributed security system 100 operate for testing and/or experimentation purposes.

The experimentation engine 120 can include an experimentation user interface 1402 for users, such as data analysts or other users. In some examples, the experimentation user interface 1402 can provide text fields, menus, selectable options, and/or other user interface elements that allow users to define experiments, such as by defining what types of event data 122 are relevant to an experiment and/or over what periods of time such event data 122 should be collected. The experimentation user interface 1402 may also include user interface elements that allow users to view event data 122, summaries or statistics of event data 122, and/or other information related to a pending or completed experiment.

The experimentation engine 120 can include an experimentation processor 1404. In some examples, the experimentation processor 1404 can translate user input about an experiment provided through the experimentation user interface 1402 into new configurations 132 for a bounding manager 128 or other element of the distributed security system 100, The experimentation processor 1404, and/or experimentation engine 120 overall, may generate configurations for bounding managers 128 directly and/or instruct a bounding service 118 to generate and/or send such configurations 132 for bounding managers 128. In other examples, the experimentation processor 1404 can translate, or provide, information from user input to the ontology service 110 and/or pattern repository 112, such that a compiler 114 can generate new executable configurations 132 for instances of the compute engine 102 that include new instructions relevant to an experiment.

Additionally, the experimentation processor 1404, and/or experimentation engine 120 overall, may request and/or receive incoming event data 122 that may be relevant to an experiment being run via the experimentation engine 120. In some examples, the experimentation engine 120 may submit a query for relevant event data 122 to storage 814 of the storage engine 116. In other examples, the experimentation engine 120 may subscribe to a customized output event stream 818 produced by an emissions generator 816 of the storage engine 116, for instance using criteria provided by the experimentation engine 120. In some examples, the experimentation processor 1404 can process the incoming event data 122 to generate summaries of the event data 122 relevant to an experiment, perform statistical analysis of such relevant event data 122, or perform any other processing of event data 122 as part of an experiment.

As discussed above with respect to FIG. 6, the experimentation engine 120 can cause configurations 132 to be provided to bounding managers 128 that may provide new or adjusted selectors 602 for bounding rules. Such configurations 132 can at least temporarily adjust how selectors 602 of bounding managers 128 operate during an experiment, such that the selectors 602 cause the bounding managers 128 to permit different amounts and/or types of event data 122 that may be more relevant to the experiment to be sent to the security network 106.

For example, the experimentation engine 120 can cause configurations 132 to be generated for one or more bounding managers 128 that include new selectors 602 for an experiment that can be implemented alongside existing selectors 602, and/or that change reporting criteria 604, markup 606, priority values 608, or other attributes of existing selectors 602 for an experiment. When a bounding manager 128 determines that one of these new or adjusted selectors 602 applies to event data 122, the selector 602 associated with the experiment can make a reporting recommendation 610 and add experiment markup 606 to the event data 122 indicating that the event data 122 is relevant to the experiment. Other selectors 602 may or may not also make reporting recommendations 610 and/or add their own markup 606. However, if a priority comparer 612 ultimately determines that the event data 122 is to be sent to the security network 106, the security agent 108 can send the experiment-relevant event data 122, including the experiment markup 606 added by the experiment's selector 602, to the security network 106. The storage engine 116 can accordingly use that experiment markup 606 to provide the experiment-relevant event data 122 to the experimentation engine 120, for example in response to a query for event data 122 with that experiment markup 606, or as part of an output event stream 818 produced by the emissions generator 816 that includes all event data 122 with the experiment markup 606. The storage engine 116 can also use any non-experiment markup 606 provided by non-experiment selectors 602 to also route or store copies of the event data 122 to other elements of the distributed security system 100.

In some examples, the experimentation engine 120 may use templates or other restriction regarding experimental selectors 602 that can be provided in configurations 132 for bounding managers 128. For example, a template may cause an experimental configuration 132 for a bounding manager 128 to include a selector 602 defined by a user with a high priority value 608 for a certain type of event data 122, but cause that selector 602 to have reporting criteria 604 with a default upper bound that is not user-configurable. As an example, a user may attempt to generate a selector 602 for an experiment that would increase the likelihood of event data 122 being reported about command line events that include a certain text string. However, if that text string is far more common in command line events than the user expected, for example occurring millions of times per hour across a sample of fifty client devices 104 associated with the experiment, the template may cause the selector 602 to have an upper bound in its reporting criteria 604 that specifies that event data 122 about no more than ten such events should be sent to the security network 106 in a minute.

As another example, a template or other restriction may limit how high of a priority value 608 a user can give an experimental selector 602. For example, global bounding rules may include selectors 602 limiting the amount of a certain type of event data 122 that can be reported to the security network 106 by any security agent 108. A template at the experimentation engine 120 may restrict experimental selectors 602 to having priority values 608 that are always less than the priority values 608 of such global selectors 602, so that experimental selectors 602 produced via the experimentation engine 120 do not cause priority comparers 612 to overrule global selectors 602 and cause more of a certain type of event data 122 to be reported to the security network 106 than the security network 106 can handle.

The experimentation engine 120 may allow users to indicate specific client devices 104, types of client devices 104, and/or a number of client devices 104 that should be part of an experiment. For example, a user can use the experimentation user interface 1402 to specify that one or more specific client devices 104, for instance as identified by a customer number or individual AIDs, are part of an experiment and should receive new configurations 132 for the experiment. As another example, a user may specify that an experiment should be performed on a random sample of client devices 104, such as a set of randomly-selected client devices 104 of a certain size. As yet another example, a user may specify that an experiment should be performed on a sample of client devices 104 that have a certain operating system or other attribute.

In these examples, the experimentation engine 120 can cause new configurations 132 for bounding managers 128, compute engines 102, and/or other elements of the security agents 108 on one or more client devices 104 associated with the experiment to be generated and provided to the client devices 104. In some examples, the experimentation engine 120 can provide targeted bounding rules associated with an experiment to specific security agents 108 on specific client devices 104 that are part of an experiment using agent-specific channel files, or by sending specialized event data 122 to those client devices 104 that can be processed by their bounding managers 128 to almost immediately change or adjust selectors 602 for bounding rules.

In other examples, the experimentation engine 120 may allow users to indicate how much of a sample of event data 122 they want to receive as part of an experiment or test, or a rate of incoming event data 122 that should be part of the sample, and the experimentation engine 120 can cause configurations 132 to be provided to one or more client devices 104 in an attempt to obtain that sample of event data 122. The experimentation engine 120 can then monitor incoming event data 122 associated with the experiment, and determine if the amount or rate of incoming event data 122 is aligned with the expected sample size or is too large or too small. If the experimentation engine 120 is receiving too much relevant event data 122, the experimentation engine 120 can automatically cause new configurations 132 to be pushed out that end the collection of that type of event data 122 for experimental purposes entirely, or that reduce the amount or rate of that type of event data 122 being sent to the security network 106. If the experimentation engine 120 is instead receiving too little relevant event data 122, the experimentation engine 120 can automatically cause new configurations 132 to be pushed out that increase the amount or rate of that type of event data 122 being sent to the security network 106, for example by adding client devices 104 to a set of client devices 104 that have been configured to report that type of event data 122 or by increasing the priority values 608 of associated selectors 602 on an existing set of client devices 104 such that they are more likely to report that type of event data 122.

As an example, an analyst may want to look for ten thousand instances of an event that occur across a set of a million client devices 104. That type of event may never occur, or may infrequently occur, on any individual client device 104, such that any individual security agent 108 would not know when enough event data 122 has been collected for the experiment. The experimentation engine 120 can cause configurations 132 for bounding managers 128 to be sent to a set of a million client devices 104 that provide a high priority value 608 for a selector 602 associated with the target type of event, to thereby increase the chances that corresponding event data will be sent to the security network 106. Once the experimentation engine 104 has received event data for ten thousand instances of that type of event, the experimentation engine 120 can cause new configurations 132 to be sent to the million client devices 104 that shut down the experiment so that the bounding managers 128 no longer prioritize sending that type of event data 122.

As another example, the experimentation engine 120 can specify that configurations 132 associated with an experiment are to be used for a certain period of time by bounding managers 128, compute engines 102, or other elements of the distributed security system 100. The elements can accordingly operate at least in part according to the experimental configurations 132 during that period of time, and then return to operating according to previous configurations 132.

Accordingly, event data 122 relevant to an experiment can be received just from a set of client devices 104 during an experiment, rather than from a broader base of client devices 104. Similarly, the experimentation engine 120 may allow analysts to test out new configurations 132 on a small number of client devices 104, review event data 122 being returned as part of the test, and determine based on the returned event data 122 whether to alter the configurations 132 or provide the configurations 132 to any or all other security agents 108 as a non-experimental configuration 132.

As yet another example, an analyst may use the experimentation engine 120 to provide new ontological definitions 134 and/or behavior patterns 142, which a compiler 114 can use to generate new executable configurations 132 for cloud and/or local instances of the compute engine 102. The analyst may suspect that a certain behavior of interest s occurring on client devices 104, but be unsure of how prevalent that behavior of interest actually is. Accordingly, the analyst can use the experimentation engine 120 to cause a new configuration 132 for the compute engine 102 to be provided to at least a small experimental set of client devices 104 and/or cloud instances of the compute engine 102, and the experimentation engine 120 can track how many times the new configuration 132 causes the compute engines 102 to detect that behavior of interest. For example, the new configuration 132 may change filter criteria associated with one or more refinement operations 202 or context collection formats 136 used by such refinement operations 202 to generate refined event data 204, and/or similarly change aspects of composition operations 302 to adjust when or how rally points 306 are created and/or when or how composition event data 304 is created. A new configuration 132 may also be used to adjust which nodes or cloud instances of the compute engine 102 are configured to process event data 122 in association with different rally points 306.

If event data 122 coining back to the experimentation engine 120 as part of the experiment shows that the behavior of interest is occurring in the wild less frequently than the analyst expected, the analyst can adjust the ontological definitions 134 and/or behavior patterns 142 in an attempt to better describe the behavior of interest or the type of event data 122 that is collected and processed, such that a second configuration 132 corresponding to the new ontological definitions 134 and/or behavior patterns 142 are provided to the experimental set or a second experimental set. If the second configuration 132 results in the behavior of interest being detected more often, the analyst may instruct the distributed security system 100 to provide that second configuration 132 to any or all compute engines 102 rather than just the one or more experimental sets.

Example System Architecture

Figure 15:
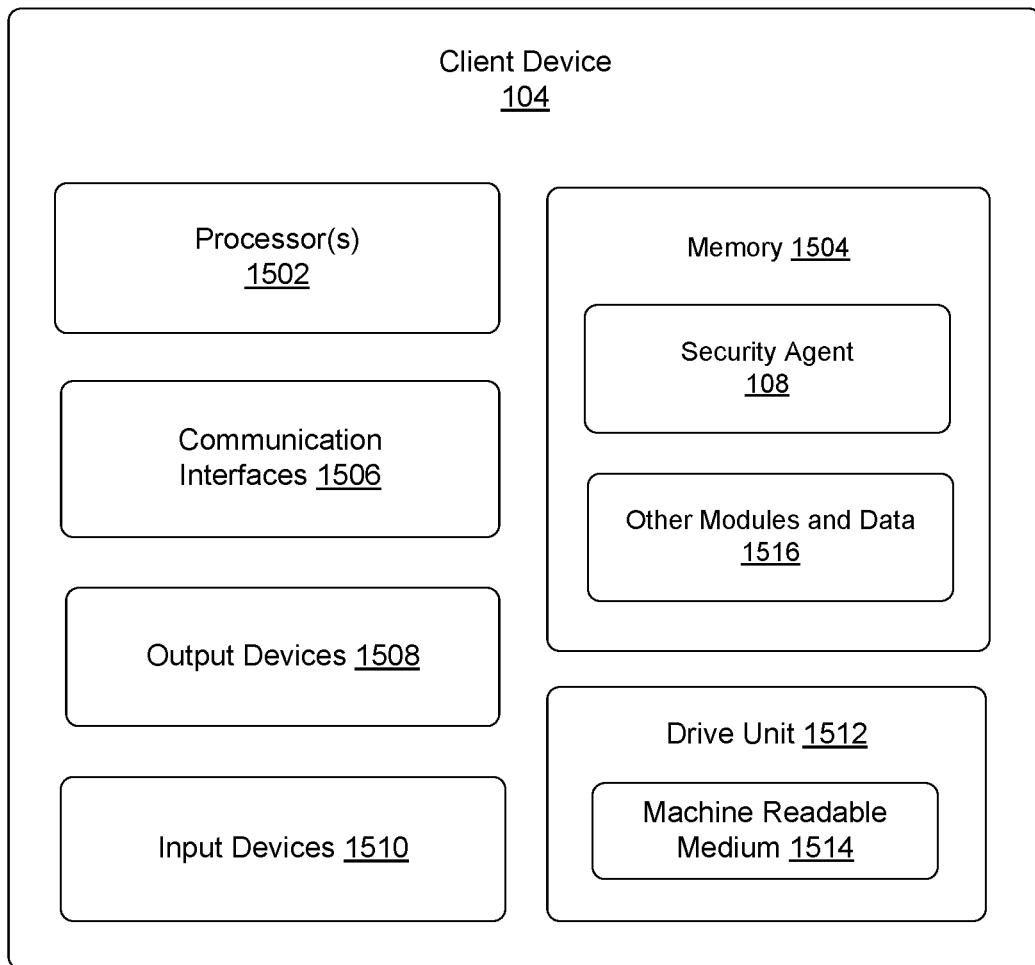
FIG. 15 depicts an example system architecture for a client device.

FIG. 15 depicts an example system architecture for a client device 104. A client device 104 can be one or more computing devices, such as a work station, a personal computer (PC), a laptop computer, a tablet computer, a personal digital assistant (PDA), a cellular phone, a media center, an embedded system, a server or server farm, multiple distributed server farms, a mainframe, or any other type of computing device. As shown in FIG. 15, a client device 104 can include processor(s) 1502, memory 1504, communication interface(s) 1506, output devices 1508, input devices 1510, and/or a drive unit 1512 including a machine readable medium 1514.

In various examples, the processor(s) 1502 can be a central processing unit (CPU), a graphics processing unit (GPU), or both CPU and GPU, or any other type of processing unit. Each of the one or more processor(s) 1502 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 1502 may also be responsible for executing drivers and other computer-executable instructions for applications, routines, or processes stored in the memory 1504, which can be associated with common types of volatile and/or nonvolatile (ROM) memory.

In various examples, the memory 1504 can include system memory, which may be volatile s as RAM), non-volatile (such as ROM, flash memory, etc.) or some combination of the two. Memory 1504 can further include non-transitory computer-readable media, such as volatile and nonvolatile, removable and non-removable media implemented in any method or technology for storage of information, such as computer-readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information and which can be accessed by the client device 104. Any such non-transitory computer-readable media may be part of the client device 104.

The memory 1504 can store data, including computer-executable instructions, for a security agent 108 as described herein. The memory 1504 can further store event data 122 configurations 132, and/or other data being processed and/or used by one or more components of the security agent 108, including event detectors 124, a compute engine 102, and a communication component 130. The memory 1504 can also store any other modules and data 1516 that can be utilized by the client device 104 to perform or enable performing any action taken by the client device 104. For example, the modules and data can a platform, operating system, and/or applications, as well as data utilized by the platform, operating system, and/or applications.

The communication interfaces 1506 can link the client device 104 to other elements through wired or wireless connections. For example, communication interfaces 1506 can be wired networking interfaces, such as Ethernet interfaces or other wired data connections, or wireless data interfaces that include transceivers, modems, interfaces, antennas, and/or other components, such as a Wi-Fi interface. The communication interfaces 1506 can include one or more modems, receivers, transmitters, antennas, interfaces, error correction units, symbol coders and decoders, processors, chips, application specific integrated circuits (ASICs), programmable circuit (e.g., field programmable gate arrays), software components, firmware components, and/or other components that enable the client device 104 to send and/or receive data, for example to exchange event data 122, configurations 132, and/or any other data with the security network 106.

The output devices 1508 can include one or more types of output devices, such as speakers or a display, such as a liquid crystal display. Output devices 1508 can also include ports for one or more peripheral devices, such as headphones, peripheral speakers, and/or a peripheral display. In some examples, a display can be a touch-sensitive display screen, which can also act as an input device 1510.

The input devices 1510 can include one or more types of input devices, such as a microphone, a keyboard or keypad, and/or a touch-sensitive display, such as the touch-sensitive display screen described above.

The drive unit 1512 and machine readable medium 1514 can store one or more sets of computer-executable instructions, such as software or firmware, that embodies any one or more of the methodologies or functions described herein. The computer-executable instructions can also reside, completely or at least partially, within the processor(s) 1502, memory 1504, and/or communication interface(s) 1506 during execution thereof by the client device 104. The processor (s) 1502 and the memory 1504 can also constitute machine readable media 1514.

Figure 16:
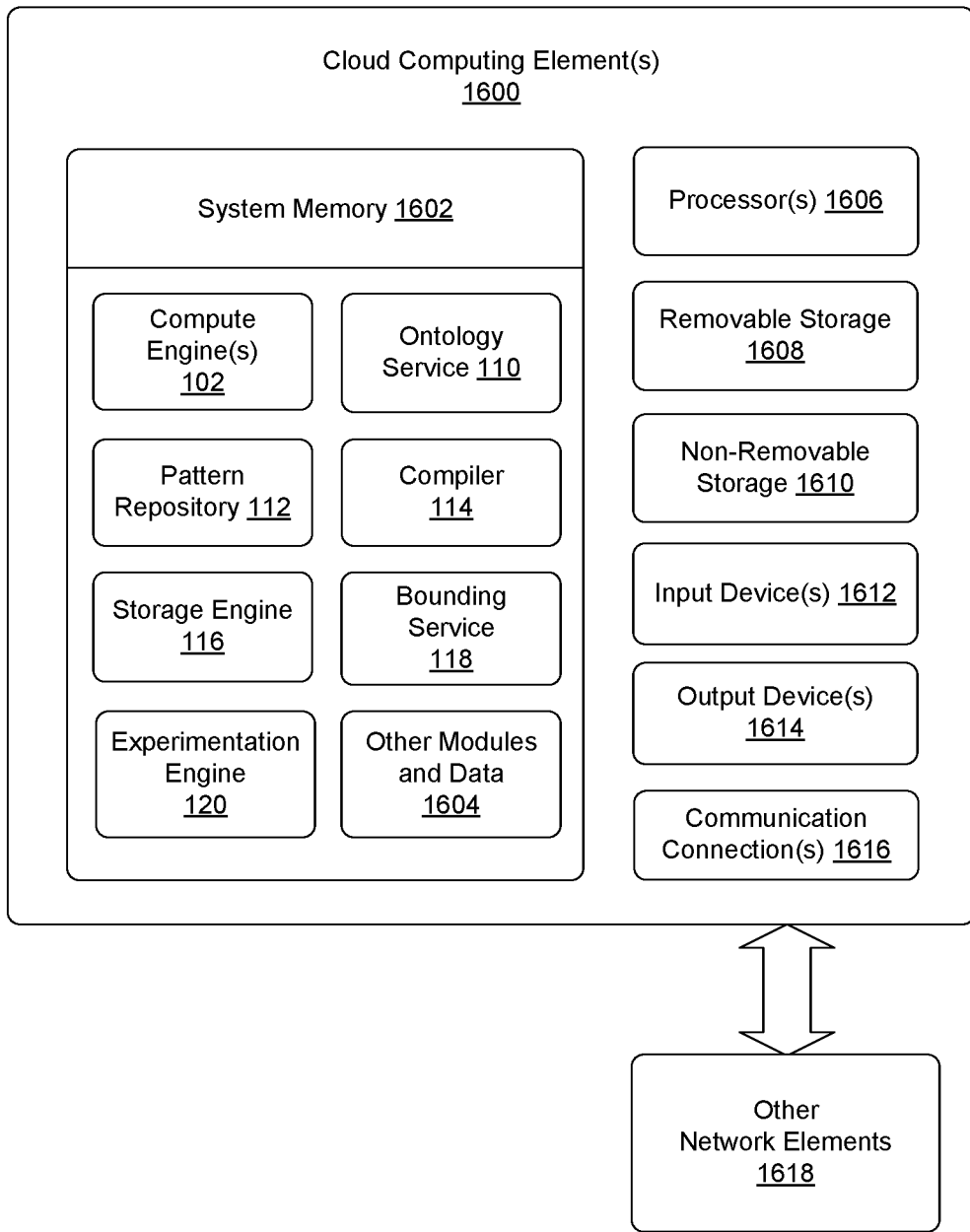
FIG. 16 depicts an example system architecture for one or more cloud computing elements of the security network.

FIG. 16 depicts an example system architecture for one or more cloud computing elements 1600 of the security network 106. Elements of the security network 106 described above can be distributed among, and be implemented by, one or more cloud computing elements 1600 such as servers, servers, server farms, distributed server farms, hardware computing elements, virtualized computing elements, and/or other network computing elements.

A cloud computing element 1600 can have a system memory 1602 that stores data associated with one or more cloud elements of the security network 106, including one or more instances of the compute engine 102, the ontology service 110, the pattern repository 112, the compiler 114, the storage engine 116, the bounding service 118, and the experimentation engine 120. Although in some examples a particular cloud computing element 1600 may store data for a single cloud element, or even portions of a cloud element, of the security network 106, in other examples a particular cloud computing element 1600 may store data for multiple cloud elements of the security network 106, or separate virtualized instances of one or more cloud elements. For example, as discussed above, the storage engine 116 can be divided into multiple virtual shards 804, and a single cloud computing element 1600 may execute multiple distinct instances of components of more than one shard 804. The system memory 1602 can also store other modules and data 1604, which can be utilized by the cloud computing element 1600 to perform or enable performing any action taken by the cloud computing element 1600. The other modules and data 1604 can include a platform, operating system, or applications, and/or data utilized by the platform, operating system, or applications.

In various examples, system memory 1602 can be volatile (such as RAM), non-volatile (such as ROM, flash memory, etc.), or some combination of the two. Example system memory 1602 can include one or more of RAM, ROM, EEPROM, a Flash Memory, a hard drive, a memory card, an optical storage, a magnetic cassette, a magnetic tape, a magnetic disk storage or another magnetic storage devices, or any other medium.

The one or more cloud computing elements 1600 can also include processor(s) 1606, removable storage 1608, non-removable storage 1610, input device(s) 1612, output device (s) 1614, and/or communication connections 1616 for communicating with other network elements 1618, such as client devices 104 and other cloud computing elements 1600.

In some embodiments, the processor(s) 1606 can be a central processing unit (CPU), a graphics processing unit (GPU), both CPU and GPU, or other processing unit or component known in the art.

The one or more cloud computing elements 1600 can also include additional data storage devices (removable and/or non-removable) such as, for example, magnetic disks, optical disks, or tape. Such additional storage is illustrated in FIG. 16 by removable storage 1608 and non-removable storage 1610. Computer storage media may include volatile and nonvolatile, removable and non-removable media implemented in any method or technology for storage of information, such as computer readable instructions, data structures, program modules, or other data. System memory 1602, removable storage 1608 and non-removable storage 1610 are all examples of computer-readable storage media. Computer-readable storage media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the desired information and which can be accessed by the one or more cloud computing elements 1600. Any such computer-readable storage media can be part of the one or more cloud computing elements 1600. In various examples, any or all of system memory 1602, removable storage 1608, and non-removable storage 1610, store computer-executable instructions which, when executed, implement some or all of the herein-described operations of the security network 106 and its cloud computing elements 1600.

In some examples, the one or more cloud computing elements 1600 can also have input device(s) 1612, such as a keyboard, a mouse, a touch-sensitive display, voice input device, etc., and/or output device(s) 1614 such as a display, speakers, a printer, etc. These devices are well known in the art and need not be discussed at length here.

The one or more cloud computing elements 1600 can also contain communication connections 1616 that allow the one or more cloud computing elements 1600 to communicate with other network elements 1618. For example, the communication connections 1616 can allow the security network 106 to send new configurations 132 to security agents 108 on client devices 104, and/or receive event data 122 from such security agents 108 on client devices 104.

CONCLUSION

Although the subject matter has been described in language specific to structural features and/or methodological acts, it is to be understood that the subject matter is not necessarily limited to the specific features or acts described above. Rather, the specific features and acts described above are disclosed as example embodiments.

What is claimed is:

1. A method, comprising:
    receiving, by a bounding manager executing on a client device, event data associated with an occurrence of an event on the client device, wherein the bounding manager comprises different selectors associated with different reporting criteria;
    generating, by the different selectors of the bounding manager, based on the different reporting criteria, different reporting recommendations associated with the event data wherein:
        the different reporting recommendations are independent recommendations of whether or not to send the event data, associated with the occurrence of the event, from the client device to a security network that is remote from the client device, and
        the different reporting recommendations, generated by the different selectors, have priority values associated with, or determined by, the different selectors;
    identifying, by the bounding manager, a highest-priority reporting recommendation from among the different reporting recommendations, based on a comparison of the priority values of the different reporting recommendations; and
    determining, by the bounding manager, whether or not to send the event data from the client device to the security network based on the highest-priority reporting recommendation.

2. The method of claim 1, further comprising: adding, by the bounding manager, markup to the event data, wherein the markup is associated with one or more of the different selectors that generate positive reporting recommendations, and wherein the markup indicates reasons why the one or more of the different selectors recommended sending the event data to the security network.

3. The method of claim 2, wherein the markup includes experimental markup associated with an experimental selector, of the different selectors, in addition to non-experimental markup associated with one or more non-experimental selectors of the different selectors.

4. The method of claim 1, wherein a selector, of the different selectors, generates a reporting recommendation, of the different reporting recommendations, based on a determination of whether statistical data about a type of the event data meets reporting criteria for the selector.

5. The method of claim 4, wherein the reporting criteria includes at least one of an upper bound or a lower bound of a count or a reporting rate.

6. The method of claim 1, wherein: at least one of the different selectors is configured according to one or more channel files received from a bounding service of the security network, and the one or more channel files comprise at least one of global channel files, customer channel files, customer group channel files, or agent-specific channel files targeted to the client device.

7. The method of claim 1, wherein at least one of the different selectors is configured according to specialized event data received from the security network.

8. The method of claim 7, wherein the specialized event data causes the bounding manager to immediately modify at least one of reporting criteria or a priority value associated with the at least one of the different selectors.

9. The method of claim 1, wherein:
    the different reporting recommendations include positive reporting recommendations, negative reporting recommendations, and neutral reporting recommendations, and
    the bounding manager is configured to disregard the neutral reporting recommendations and to identify the highest-priority reporting from among the positive reporting recommendations and the negative reporting recommendations.

10. The method of claim 1, further comprising:
    receiving, by the bounding manager, additional event data associated with additional occurrences of events on the client device that have common attributes;
    generating, by the bounding manager, statistical data that tracks a count of the additional occurrences of events; and
    sending, by the bounding manager, the statistical data to the security network.

11. A client device, comprising:
    one or more processors;
    memory storing computer-executable instructions that, when executed by the one or more processors, cause the client device to perform operations comprising:
        detecting event data associated with an occurrence of an event on the client device;
        generating, by different selectors of a bounding manager executing on the client device, the different selectors being associated with different reporting criteria, different reporting recommendations associated with the event data, wherein: the different reporting recommendations are independent recommendations of whether or not to send
            the event data, associated with the occurrence of the event, associated with the occurrence of the event, from the client device to a security network that is remote from the client device, and
            the different reporting recommendations, generated by the different selectors, have priority values associated with, or determined by, the different selectors;
        identifying a highest-priority reporting recommendation from among the different reporting recommendations, based on a comparison of the priority values of the different reporting recommendations; and determining whether or not to send the event data from the client device to the security network based on the highest-priority reporting recommendation.

12. The client device of claim 11, wherein: the operations further comprise adding markup to the event data, the markup is associated with one or more of the different selectors that generate positive reporting recommendations, and the markup indicates reasons why the one or more of the different selectors recommended sending the event data to the security network.

13. The client device of claim 11, wherein a selector, of the different selectors, generates a reporting recommendation, of the different reporting recommendations, based on a determination of whether statistical data about a type of the event data meets reporting criteria for the selector, the reporting criteria including at least one of an upper bound or a lower bound of a count or a reporting rate.

14. The client device of claim 11, wherein at least one of the different selectors is configured according to one or more configurations received from the security network.

15. The client device of claim 11, wherein the operations further comprise:
receiving additional event data associated with additional occurrences of events on the client device that have common attributes;
generating statistical data that tracks a count of the additional occurrences of events; and
sending the statistical data to the security network.

16. One or more non-transitory computer-readable media storing computer-executable instructions for a client device that, when executed by one or more processors of the client device, cause the client device to perform operations comprising:
detecting event data associated with an occurrence of an event on the client device;
generating, by different selectors of a bounding manager executing on the client device, the different selectors being associated with different reporting criteria, different reporting recommendations associated with the event data, wherein:
the different reporting recommendations are independent recommendations of whether or not to send the event data, associated with the occurrence of the event, from the client device to a security network that is remote from the client device, and
the different reporting recommendations, generated by the different selectors, have priority values associated with, or determined by, the different selectors;
identifying a highest-priority reporting recommendation from among the different reporting recommendations, based on a comparison of the priority values of the different reporting recommendations; and
determining whether or not to send the event data from the client device to the security network based on the highest-priority reporting recommendation.

17. The one or more non-transitory computer-readable media of claim 16, wherein:
the operations further comprise adding markup to the event data,
the markup is associated with one or more of the different selectors that generate positive reporting recommendations, and
the markup indicates reasons why the one or more of the different selectors recommended sending the event data to the security network.

18. The one or more non-transitory computer-readable media of claim 16, wherein a selector, of the different selectors, generates a reporting recommendation, of the different reporting recommendations, based on a determination of whether statistical data about a type of the event data meets reporting criteria for the selector, the reporting criteria including at least one of an upper bound or a lower bound of a count or a reporting rate.

19. The one or more non-transitory computer-readable media of claim 16, wherein at least one of the different selectors is configured according to one or more configurations received from the security network.

20. The one or more non-transitory computer-readable media of claim 16, wherein the operations further comprise:
receiving additional event data associated with additional occurrences of events on the client device that have common attributes;
generating statistical data that tracks a count of the additional occurrences of events; and
sending the statistical data to the security network.

* * * * *